(12) United States Patent
Ohta et al.

(10) Patent No.: US 6,538,700 B1
(45) Date of Patent: Mar. 25, 2003

(54) SYNCHRONIZING CONVERSION APPARATUS AND METHOD AS WELL AS RECORDING MEDIUM

(75) Inventors: Masashi Ohta, Tokyo (JP); Kyoko Fukuda, Kanagawa (JP); Hiroshi Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 367 days.

(21) Appl. No.: 09/602,828

(22) Filed: Jun. 23, 2000

(30) Foreign Application Priority Data

Jun. 25, 1999 (JP) .......................................... 11-179129
Mar. 30, 2000 (JP) ....................................... 2000-092633

(51) Int. Cl.⁷ ............................................. H04N 9/475
(52) U.S. Cl. ...................... 348/513; 348/571; 348/718
(58) Field of Search ................................. 348/513, 512, 348/514, 497, 571, 536, 537, 565, 567, 568, 714, 715, 718; 345/564, 566, 547; H04N 9/475

(56) References Cited

U.S. PATENT DOCUMENTS 4,862,269 A * 8/1989 Sonoda et al. ............... 348/514
5,124,790 A * 6/1992 Nakayama ................. 375/240.25
5,359,366 A * 10/1994 Ubukata et al. ............. 348/536
5,452,010 A * 9/1995 Doornink .................... 348/497
5,835,164 A * 11/1998 Kanai et al. ................. 348/742
5,861,879 A * 1/1999 Shimizu et al. .............. 345/213
6,380,981 B1 * 4/2002 Kasezawa et al. .......... 348/515
6,441,863 B1 * 8/2002 Miyazaki et al. ........... 348/567

\* cited by examiner

*Primary Examiner*—Michael H. Lee
(74) *Attorney, Agent, or Firm*—Frommer Lawrence & Haug LLP; William S. Frommer

(57) ABSTRACT

The invention provides a synchronizing conversion apparatus wherein outpacing compensation can be executed with a circuit construction including a comparatively small number of components. A read control circuit produces a read control signal including a read address and a read timing based on an outpacing detection signal from a phase comparison circuit, which is generated taking a time required for processing of a memory access arbitration circuit into consideration, and a scene change detection signal from a scene change detection circuit. The read control signal is outputted to the memory access arbitration circuit. The memory access arbitration circuit arbitrates requests from a write control circuit and the read control circuit to control writing into and reading out from a frame memory.

9 Claims, 18 Drawing Sheets

F I G. 16
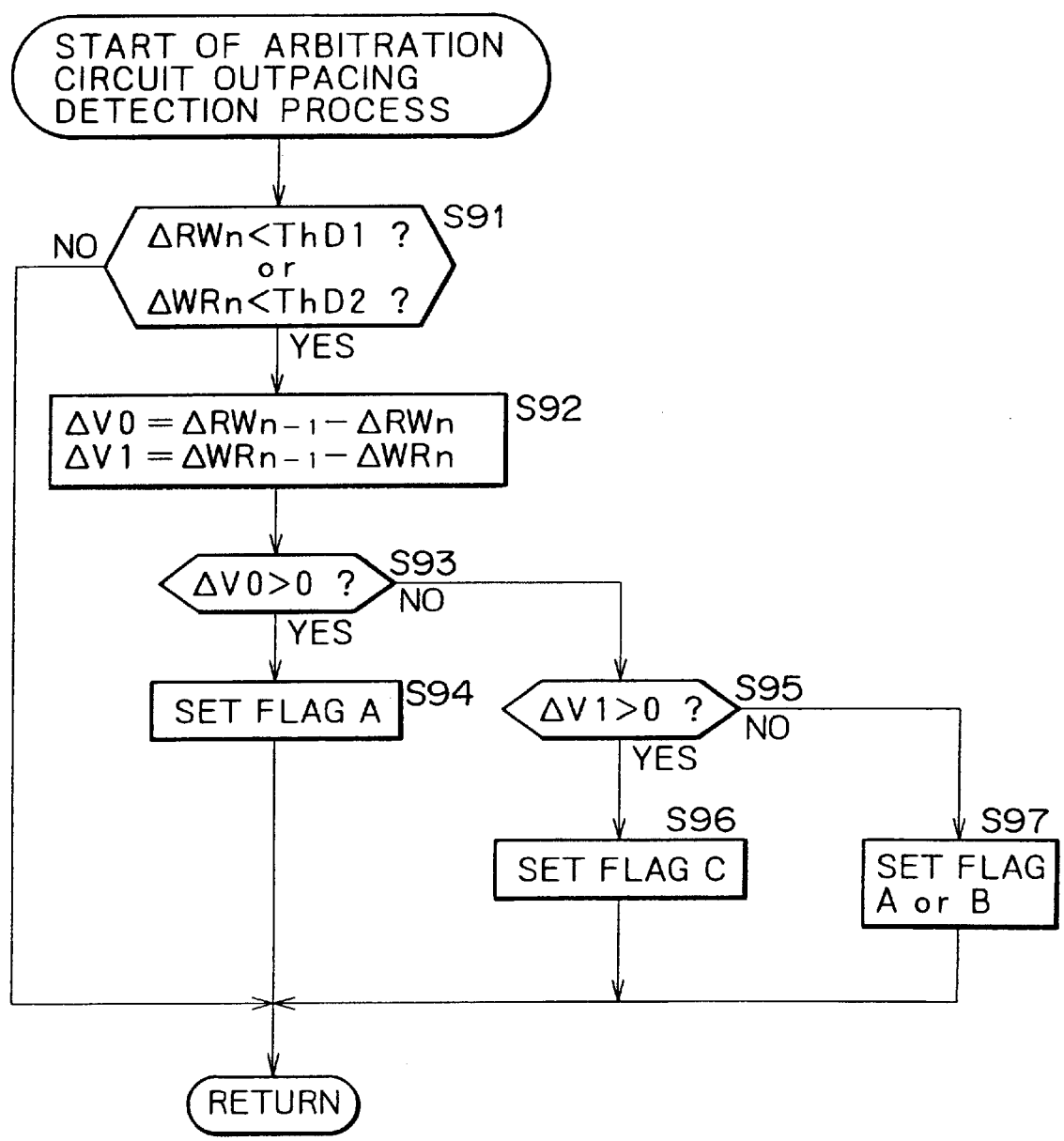

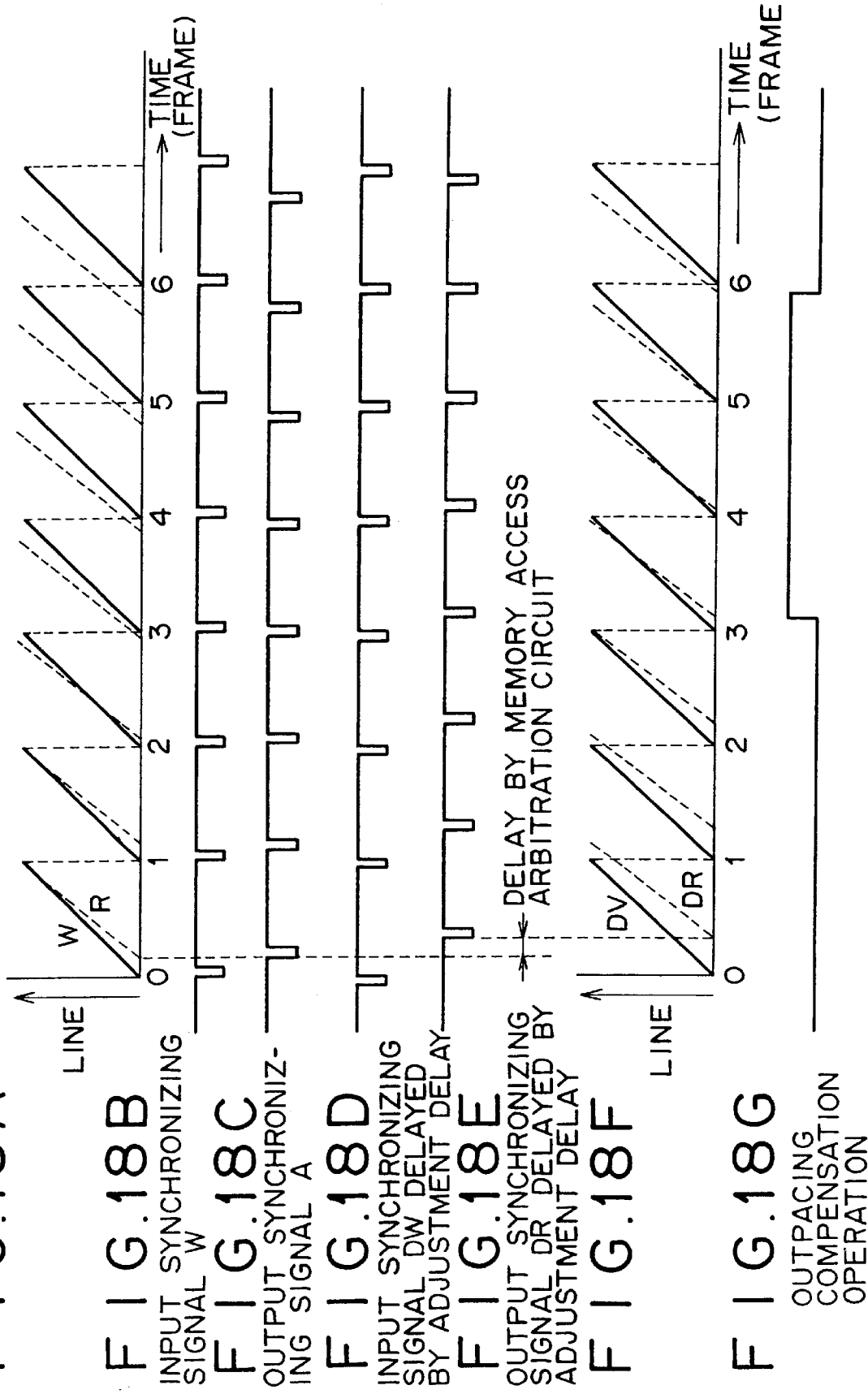

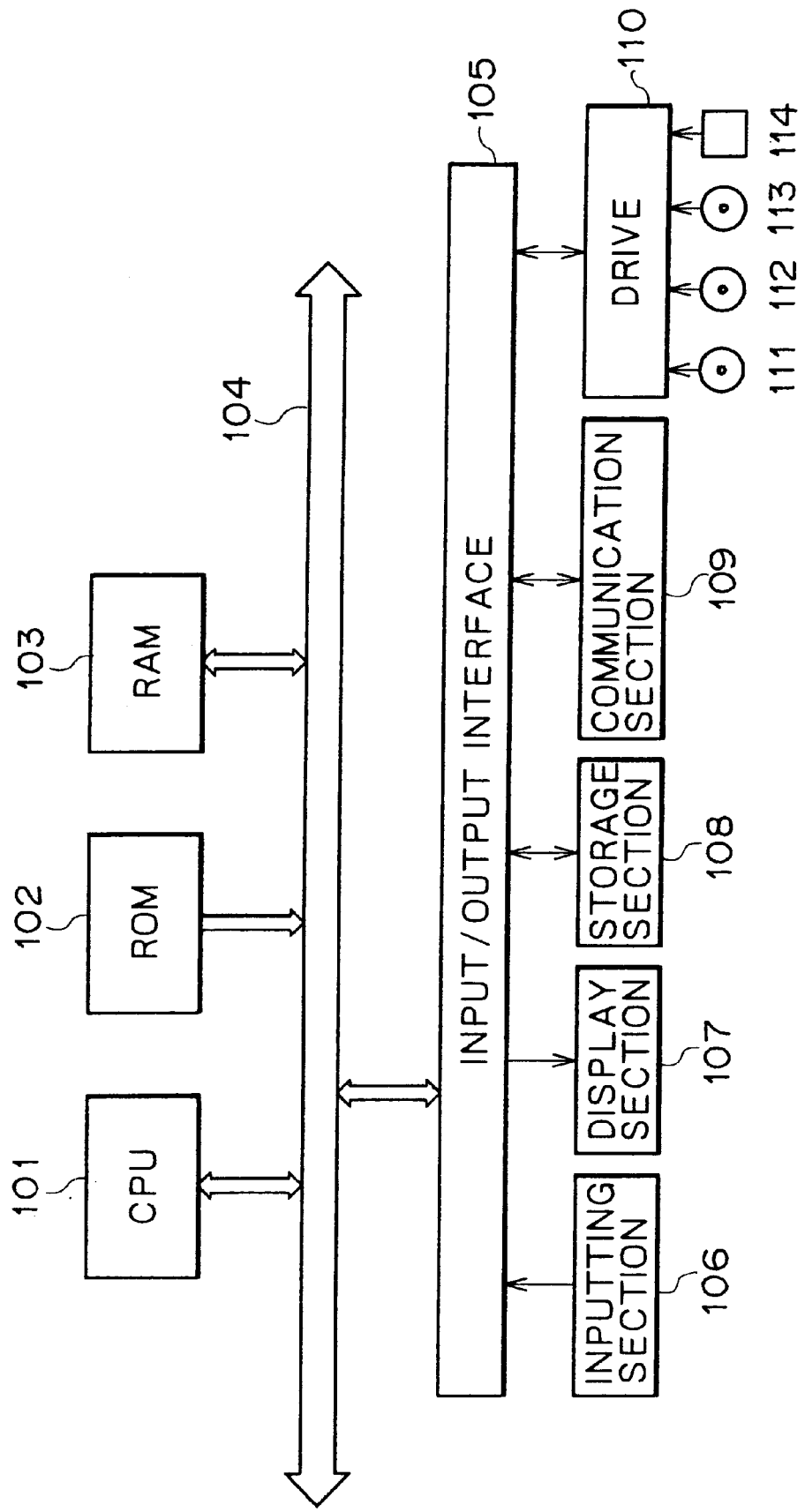

SYNCHRONIZING CONVERSION APPARATUS AND METHOD AS WELL AS RECORDING MEDIUM

BACKGROUND OF THE INVENTION

This invention relates to a synchronizing conversion method and apparatus as well as a recording medium, and more particularly to a synchronizing conversion apparatus and method as well as a recording medium suitable for use to convert a synchronizing frequency, for example, of an image signal into a different frequency.

In order to output an image signal in synchronism with a frequency (hereinafter referred to as output synchronizing signal) different from a synchronizing frequency (hereinafter referred to as an input synchronizing signal) of a frame synchronizing signal of the image signal, usually a method is used wherein the image signal is written into a frame memory in synchronism with the input synchronizing signal and then read out from the frame memory in synchronism with the output synchronizing signal. However, from a difference in cycle length between the input synchronizing signal and the output synchronizing signal, it sometimes occurs that the write address for the frame memory outpaces the read address or conversely the read address outpaces the write address.

The phenomenon is described in more detail. Referring to FIG. 1A, the axis of abscissa indicates the time and the axis of ordinate indicates the address of a frame memory, and writing and reading out timings of an image signal into and from the frame memory are illustrated. When the cycle of the output synchronizing signal is shorter than the cycle of the input synchronizing signal, the read address outpaces the write address at a rear half portion of the read cycle (R2) for the second frame. Consequently, the image signal of the first frame is read out as the image signal of the second frame at and later than the rear half portion of the read cycle of the second frame. Further, in the read cycle (R3) for the third frame, since the read address precedes the write address completely, the image signal of the second frame is read out as the image signal of the third frame.

Referring to FIG. 1B, the input synchronizing signal $WV_n$, and the output synchronizing signal $RV_n$ (n=0, 1, 2, ...) indicate timings at which the 0th frame of the image signal is written and read out, respectively. A state wherein one cycle of the output synchronizing signal is included within one cycle of the input synchronizing signal like, for example, a state wherein one cycle from an output synchronizing signal RV2 to a next output synchronizing signal RV3 is included within one cycle from an input synchronizing signal WV2 to a next input synchronizing signal WV3, indicates that the read address has outpaced the write address.

On the contrary, when the cycle of the output synchronizing signal is longer than the cycle of the input synchronizing signal, the write address outpaces the read address at a rear half portion of the read cycle (R2) for the second frame as seen in FIG. 2A. Consequently, the image signal of the third frame is read out as the image signal of the second frame at and later than the rear half portion of the read cycle of the second frame. Further, in the read cycle (R3) for the third frame, since the write address precedes the read address completely, the image signal of the fourth frame is read out as the image signal of the third frame.

Referring to FIG. 2B, a state wherein one cycle of the input synchronizing signal is included within one cycle of the output synchronizing signal like, for example, a state wherein one cycle from an input synchronizing signal WV3 to a next input synchronizing signal WV4 is included within one cycle from an output synchronizing signal RV2 to a next output synchronizing signal RV3, indicates that the write address has outpaced the read address.

A method for solving the problem of such outpacing between a write address and a read address is disclosed, for example, in Japanese Patent Laid-Open No. Hei 9-18740 wherein a phase difference between the input synchronizing signal and the output synchronizing signal is detected and the write address for the frame memory is controlled based on the phase difference thus detected.

The method of controlling the write address in this manner, however, has a subject to be solved in that, in order to convert a synchronizing frequency of an image signal into a plurality of signals of different output synchronizing frequencies, a number of circuits each including a frame memory, a write control circuit and so forth equal to the number of kinds of output synchronizing signals to be converted must be provided.

The method described above has another subject to be solved in that, since it can be applied only where the frequencies of the input synchronizing signal and the output synchronizing signal are invariable (stable), for example, if the input synchronizing signal or the output synchronizing signal suffers from fluctuation in frequency, then outpacing compensation cannot be executed accurately.

The method described above has a further subject to be solved in that, since outpacing compensation is executed at any time, repetition of an image or jumping of an image originating from the outpacing compensation may possibly occur in a series of scenes which exhibit some continuous motion, resulting in a visually unnatural image.

SUMMARY OF THE INVENTION

It is an object of the present invention to provide a synchronizing conversion apparatus and method as well as a recording medium wherein outpacing compensation can be executed with a circuit construction including a comparatively small number of components.

In order to attain the object described above, according to the present invention, a read address of a frame memory is controlled appropriately.

In particular, according to an aspect of the present invention, there is provided a synchronizing conversion apparatus for converting a synchronizing frequency of an image signal, comprising an image memory, write means for writing the image signal into the image memory in synchronism with a first synchronizing frequency signal inputted thereto, read means for reading out the image signal from the image memory in synchronism with a second synchronizing frequency signal inputted to the read means and having a frequency different from that of the first synchronizing frequency signal, detection means for detecting a phase difference between the first and second synchronizing frequency signals, prediction means for predicting occurrence of outpacing between a read address and a write address for the image memory based on the phase difference detected by the detection means, modification means for modifying a reading out timing of the read means in response to a result of the prediction of the prediction means, and delay compensation means for executing delay compensation for the image signal read out by the read means in response to the result of the prediction of the prediction means.

The detection means may additionally detect a variation of the phase difference which arises from a fluctuation of the frequency of the first or second synchronizing frequency signal.

The synchronizing conversion apparatus may further comprise scene change detection means for detecting a scene change of the image signal, and the modification means may modify the reading out timing of the read means in response to a timing at which a scene change of the image signal is detected by the scene change detection means.

The synchronizing conversion apparatus may comprise two or more read systems each of which includes the read means, detection means, prediction means, modification means and delay compensation means.

In this instance, the synchronizing conversion apparatus may further comprise arbitration means for arbitrating the writing process of the write means into the image memory and reading out processes of the read means of the read systems from the image memory. The prediction means may predict occurrence of outpacing between the read address and the write address for the image memory based on the phase difference detected by the detection means and a time required for the arbitration process of the arbitration means. The synchronizing conversion apparatus may further comprise delay means for delaying the first and second synchronizing frequency signals by a time required for the arbitration process of the arbitration means and supplying the delayed first and second synchronizing frequency signals to the detection means.

According to another aspect of the present invention, there is provided a synchronizing conversion method for a synchronizing conversion apparatus for converting a synchronizing frequency of an image signal, comprising a write step of writing the image signal into an image memory in synchronism with a first synchronizing frequency signal inputted to the synchronizing conversion apparatus, a read step of reading out the image signal from the image memory in synchronism with a second synchronizing frequency signal inputted to the synchronizing conversion apparatus and having a frequency different from that of the first synchronizing frequency signal, a detection step of detecting a phase difference between the first and second synchronizing frequency signals, a prediction step of predicting occurrence of outpacing between a read address and a write address for the image memory based on the phase difference detected by the detection step, a modification step of modifying a reading out timing of the read step in response to a result of the prediction of the prediction step, and a delay compensation step of executing delay compensation for the image signal read out by the read step in response to the result of the prediction of the prediction step.

According to a further aspect of the present invention, there is provided a recording medium on which a computer-readable program for synchronizing conversion for converting a synchronizing frequency of an image signal is recorded, the program comprising a write step of writing the image signal into an image memory in synchronism with a first synchronizing frequency signal inputted to the synchronizing conversion apparatus, a read step of reading out the image signal from the image memory in synchronism with a second synchronizing frequency signal inputted to the synchronizing conversion apparatus and having a frequency different from that of the first synchronizing frequency signal, a detection step of detecting a phase difference between the first and second synchronizing frequency signals, a prediction step of predicting occurrence of outpacing between a read address and a write address for the image memory based on the phase difference detected by the detection step, a modification step of modifying a reading out timing of the read step in response to a result of the prediction of the prediction step, and a delay compensation step of executing delay compensation for the image signal read out by the read step in response to the result of the prediction of the prediction step.

With the synchronizing conversion apparatus and method as well as the program of the recording medium, an image signal is written into the image memory in synchronism with an inputted first synchronizing frequency signal. Then, the image signal is read out from the image memory in synchronism with a second synchronizing frequency signal having a frequency different from that of the first synchronizing frequency signal. Further, a phase difference between the first and second synchronizing frequency signals is detected, and occurrence of outpacing between a read address and a write address for the image memory is predicted based on the detected phase difference. Then, the read timing is modified in response to a result of the prediction, and delay compensation is executed for the image signal read out from the image memory in response to the result of the prediction. Consequently, outpacing compensation can be executed with a circuit construction which includes a smaller number of components than ever.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 16 is a flowchart illustrating an arbitration circuit outpacing detection process of the outpacing detection process of FIG. 15;

FIGS. 18A to 18G are waveform diagrams illustrating operation of the frame synchronizer of FIG. 17; and FIG. 19 is a block diagram showing a personal computer.

DESCRIPTION OF THE PREFERRED EMBODIMENTS

Figure 3:
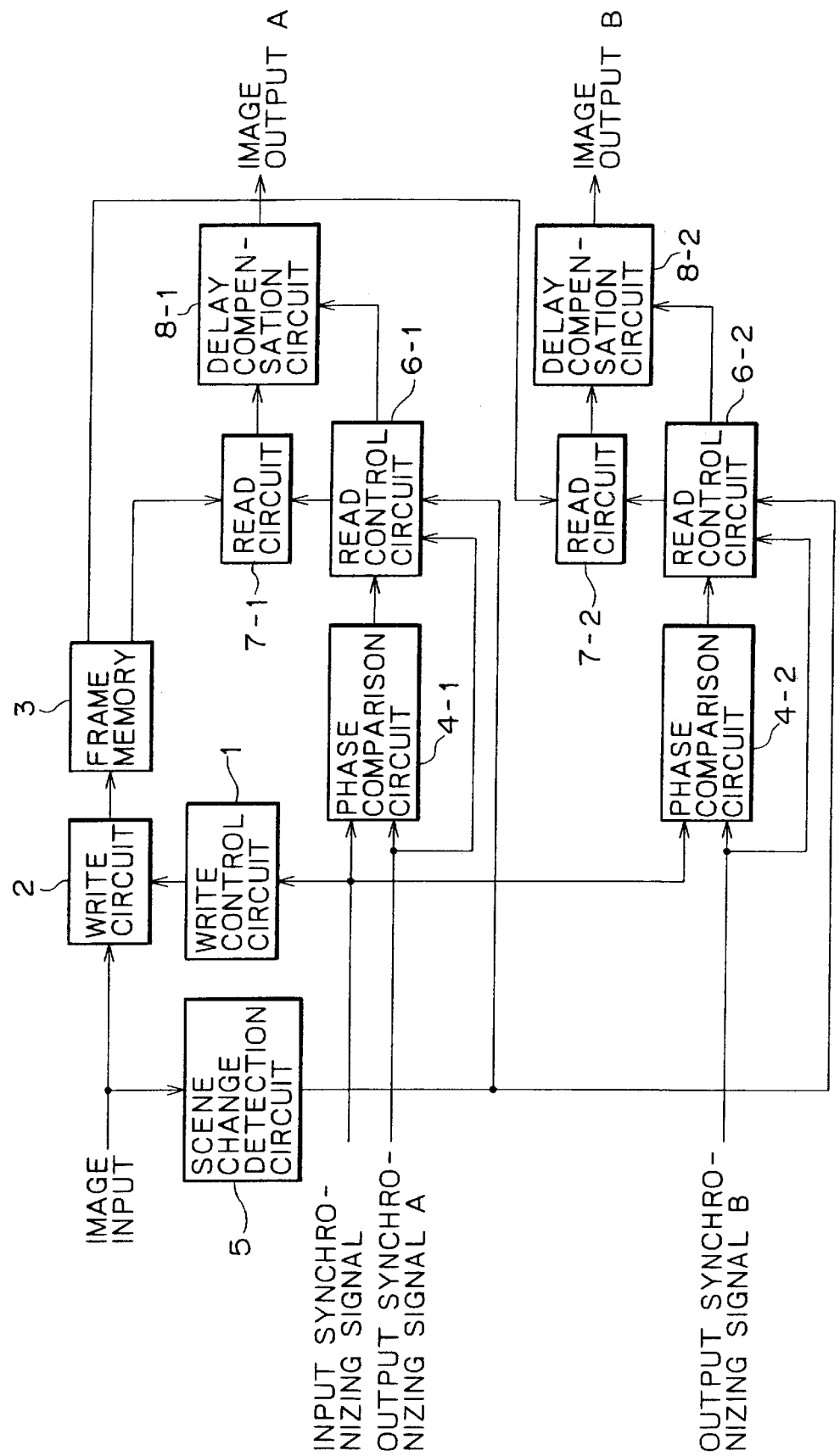
FIG. 3 is a block diagram showing a first example of a construction of a frame synchronizer to which the present invention is applied.

Referring to FIG. 3, there is shown a first example of a construction of a frame synchronizer to which the present invention is applied. The frame synchronizer receives an image signal inputted in synchronism with a predetermined input synchronizing signal, superposes the image signal on two different output synchronizing signals A and B and outputs resulting image signals. The image signal inputted is supplied to a write circuit 2 and a scene change detection circuit 5, and the corresponding input synchronizing signal is supplied to a write control circuit 1 and a pair of phase comparison circuits 4-1 and 4-2. The output synchronizing signal A is supplied to the phase comparison circuit 4-1 and a read control circuit 6-1, and the output synchronizing signal B is supplied to the phase comparison circuit 4-2 and another read control circuit 6-2.

The write control circuit 1 decides, based on the input synchronizing signal supplied thereto, a write address and a writing timing when an image signal is to be written into a frame memory 3, and controls the write circuit 2. The write circuit 2 writes the image signal inputted thereto into the frame memory 3 under the control of the write control circuit 1.

The phase comparison circuit 4-1 normally supervises the phase difference between the input synchronizing signal and the output synchronizing signal to predict occurrence of outpacing and outputs information of the predicted occurrence of outpacing as an outpacing detection signal to the read control circuit 6-1.

Figure 4:
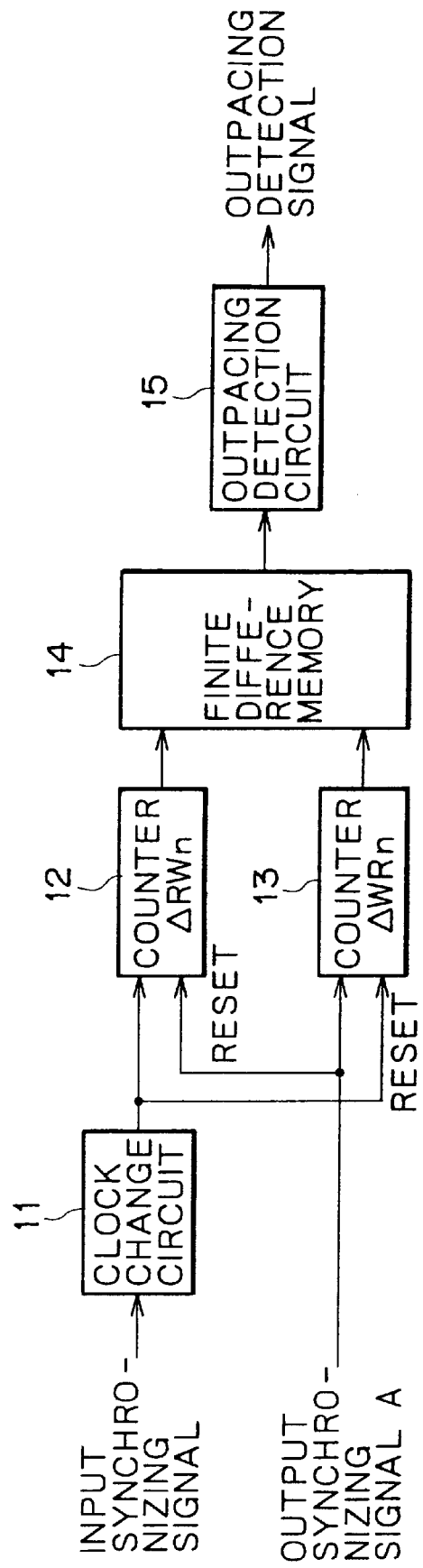
FIG. 4 is a block diagram showing an example of a construction of a phase comparison circuit of the frame synchronizer of FIG. 3.

FIG. 4 shows an example of a detailed construction of the phase comparison circuit 4-1. Referring to FIG. 4, the phase comparison circuit 4-1 includes a clock change circuit 11 to which the input synchronizing signal is inputted. The input synchronizing signal is superposed onto a different clock signal for an output system by the clock change circuit 11 and then supplied to a pair of resettable counters 12 and 13. The output synchronizing signal A is supplied as it is to the resettable counters 12 and 13.

Figure 1:
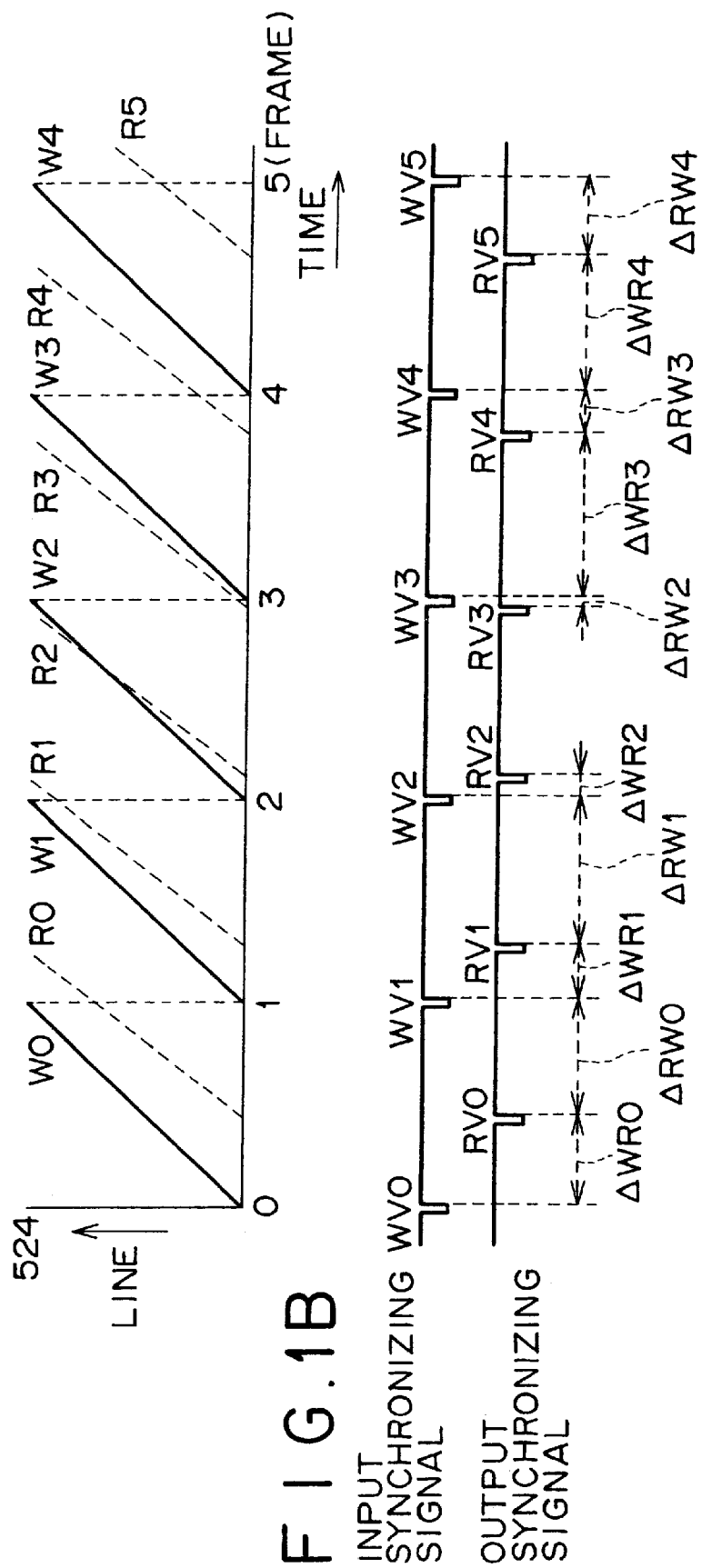
FIGS. 1A and 1B are diagrammatic views illustrating outpacing which occurs with a frame memory.
Figure 2:
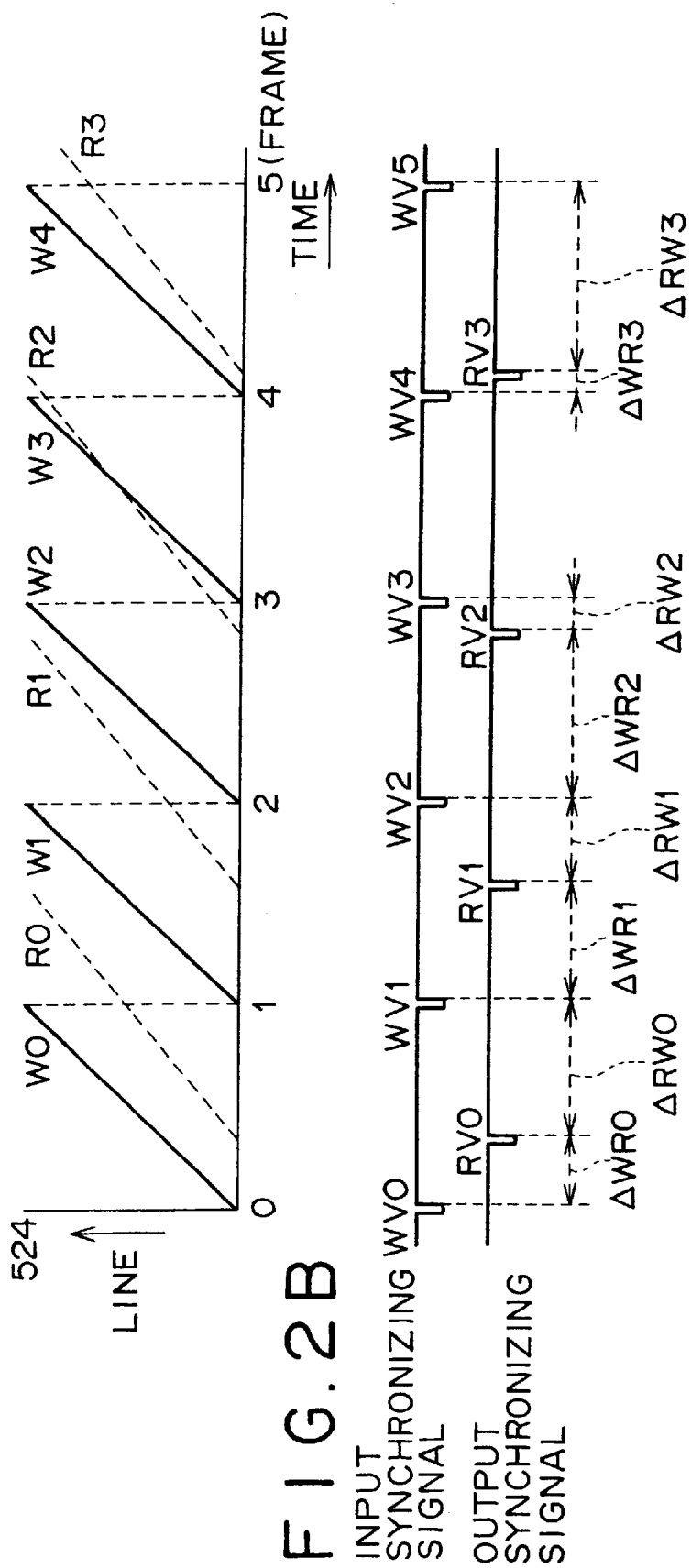
FIGS. 2A and 2B are diagrammatic views illustrating outpacing which occurs with a frame memory.

The resettable counter 12 uses the output synchronizing signal A inputted to a reset signal input terminal thereof as a trigger to count a finite difference time $\Delta RW_n$ (FIGS. 1B and 2B) until the input synchronizing signal is inputted, and outputs its count value to a finite difference memory 14. The resettable counter 13 uses the input synchronizing signal inputted to a reset signal input terminal thereof as a trigger to count a finite difference time $\Delta WR_n$ until the output synchronizing signal A is inputted thereto, and outputs its count value to the finite difference memory 14. The finite difference memory 14 stores a predetermined number of pairs of such finite difference times $\Delta RW_n$ and $\Delta WR_n$ inputted thereto from the resettable counters 12 and 13, respectively.

An outpacing detection circuit 15 reads out the finite difference times $\Delta RW_n$, $\Delta RW_{n-1}$, $\Delta WR_n$ and $\Delta WR_{n-1}$ stored in the finite difference memory 14 and then discriminates the directionality of the output synchronizing signal A with respect to the input synchronizing signal. More particularly, the outpacing detection circuit 15 discriminates whether the output synchronizing signal A may outpace the input synchronizing signal or may be delayed from the input synchronizing signal.

The outpacing detection circuit 15 further compares the finite difference times $\Delta RW_n$ and $\Delta WR_n$ with a predetermined threshold value and generates a flag based on a result of the comparison. In particular, the outpacing detection circuit 15 generates a flag (flag A or flag C) for urging to execute an outpacing compensation process, another flag (flag B or flag D) for urging to restore the read timing against a delay caused by outpacing compensation or a further flag (flag H1 or flag H2) for urging to execute an outpacing compensation process for outpacing arising from a fluctuation of the frequency of the input synchronizing signal or the output synchronizing signal A. The outpacing detection circuit 15 outputs the thus generated flag as an outpacing detection signal to the read control circuit 6-1.

A detailed outpacing detection process of the outpacing detection circuit 15 is described with reference to a flowchart of FIG. 5. The outpacing detection process is started when the input synchronizing signal and the output synchronizing signal A are inputted to the phase comparison circuit 4-1.

In step S1, the outpacing detection circuit 15 discriminates whether or not the phases of the input synchronizing signal and the output synchronizing signal A inputted thereto are within an outpacing area. Here, the outpacing area signifies an area wherein the output synchronizing signal appears twice within one cycle of the input synchronizing signal like the one cycle from WV2 to WV3 of the input synchronizing signal of FIG. 1B or another area wherein the input synchronizing signal appears twice within one cycle of the output synchronizing signal like the one cycle from RV2 to RV3 of the output synchronizing signal of FIG. 2B.

If it is discriminated in step S1 that the phases of the input synchronizing signal and the output synchronizing signal A are within an outpacing area, then the processing advances to step S2. In step S2, the outpacing detection circuit 15 stands by until the input synchronizing signal for a next frame image and the output synchronizing signal A are inputted, and thereafter, the processing returns to step S1. If it is discriminated in step S1 that the phases of the input synchronizing signal and the output synchronizing signal A are not within an outpacing area, then the processing advances to step S3. As a result of the processing in steps S1 and S2, the following processing beginning with step S3 is started in a state wherein the phases of the input synchronizing signal and the output synchronizing signal A inputted are not within an outpacing area.

In step S3, the outpacing detection circuit 15 reads out the current finite difference time $\Delta RW_n$ and the preceding finite difference time $\Delta RW_{n-1}$ of the input synchronizing signal and the output synchronizing signal A from the finite difference memory 14 and calculates an evaluation value $\Delta V0$ for prediction of occurrence of outpacing and discrimination of the directionality of the outpacing using the following expression (1):

$$\Delta V0 = (\Delta RW_{n-1}) - (\Delta RW_n) \quad (1)$$

Then in step S4, the outpacing detection circuit 15 discriminates whether or not the evaluation value ΔV0 is higher than 0. If the outpacing detection circuit 15 discriminates that the evaluation value ΔV0 is higher than 0, then it advances the processing to step S5.

In step S5, the outpacing detection circuit 15 discriminates whether or not the current finite difference time $\Delta RW_n$ is lower than a threshold value ThA. The threshold value ThA is a value given in advance to the outpacing detection circuit 15 and determined in accordance with the capacity of a pair of line memories 31 and 32 (shown in FIG. 10) built in a delay compensation circuit 8-1 which is hereinafter described. Where the capacity of the line memories 31 and 32 is L lines and the time of one horizontal scanning period is represented by H, the threshold value ThA is represented by the following expression (2):

$$-LH < ThA < 0 \quad (2)$$

If it is discriminated in step S5 that the current finite difference time $\Delta RW_n$ is lower than the threshold value ThA, then the processing advances to step S6, but on the contrary if it is discriminated that the current finite difference time $\Delta RW_n$ is not lower than the threshold value ThA, then the processing advances to step S10.

In step S6, the outpacing detection circuit 15 outputs the outpacing flag A as its outpacing detection signal to the read control circuit 6-1. In step S7, the outpacing detection circuit 15 discriminates again whether or not the phases of the input synchronizing signal and the output synchronizing signal A are within an outpacing area. This is because it is necessary to vary the object of comparison for decision of a later operation depending upon whether or not the phases of the input synchronizing signal and the output synchronizing signal A are within an outpacing area after outpacing compensation is executed.

If it is discriminated in step S7 that the phases of the input synchronizing signal and the output synchronizing signal A are within an outpacing area, then the processing advances to step S8. In step S8, the outpacing detection circuit 15 discriminates whether or not the finite difference time $\Delta WR_{n+2}$ obtained using the input synchronizing signal later by two cycles as a trigger is higher than a threshold value ThB. Here, the threshold value ThB is a value given in advance to the outpacing detection circuit 15 and is determined in accordance with the capacity of the line memories 31 and 32 built in the delay compensation circuit 8-1 which is hereinafter described similarly to the threshold value ThA. Where the capacity of the line memories 31 and 32 is L lines, the threshold value ThB is represented by the following expression (3):

$$LH < ThB < (\text{line number of 1 frame}) - (-ThA) \quad (3)$$

It is to be noted, however, that, where the image signal is an NTSC signal, the line number of 1 frame is 525, but where the image signal is a PAL signal, the line number of 1 frame is 625.

If it is discriminated in step S8 that the finite difference time $\Delta WR_{n+2}$ is higher than the threshold value ThB, then the processing advances to step S9. In step S9, the outpacing detection circuit 15 outputs the outpacing flag B as an outpacing detection signal to the read control circuit 6-1.

In step S10, the outpacing detection circuit 15 stands by until the input synchronizing signal for a next frame image and the output synchronizing signal A are inputted. Thereafter, the processing returns to step S3 so that similar processing to that described above is repeated.

On the other hand, if it is discriminated in step S7 that the phases of the input synchronizing signal and the output synchronizing signal A are not within an outpacing area, then the processing advances to step S11. In step S11, the outpacing detection circuit 15 discriminates whether or not the finite difference time $\Delta RW_{n+1}$ obtained using the output synchronizing signal A later by one cycle as a trigger are higher than a threshold value ThH. The threshold value ThH is a value given in advance to the outpacing detection circuit 15 and determined in accordance with the following expression (4):

$$0 < ThH < -ThA \quad (4)$$

If it is discriminated in step S11 that the finite difference time $\Delta RW_{n+1}$ is higher than the threshold value ThH, the processing advances to step S13. In step S13, the outpacing detection circuit 15 outputs the outpacing flag H1 as its outpacing detection signal to the read control circuit 6-1.

On the hand, if it is discriminated in step S8 that the finite difference time $\Delta WR_{n+2}$ is not lower than the threshold value ThB or if it is discriminated in step S11 that the finite difference time $\Delta RW_{n+1}$ is not higher than the threshold value ThH, then the processing advances to step S12. In step S12, the outpacing detection circuit 15 stands by until the input synchronizing signal corresponding to a next frame image and the output synchronizing signal A are inputted, and thereafter, the processing returns to step S7 so that similar processing to that described above is repeated.

If it is discriminated in step S4 by the outpacing detection circuit 15 that the evaluation value ΔV0 is not higher than 0, the processing advances to step S14. In step S14, the outpacing detection circuit 15 reads out the current finite difference time $\Delta WR_n$ and the preceding finite difference time $\Delta WR_{n-1}$ of the input synchronizing signal and the output synchronizing signal A from the finite difference memory 14 and calculates an evaluation value ΔV1 for prediction of occurrence of outpacing and discrimination of the directionality of the outpacing using the following expression (5):

$$\Delta V1 = (\Delta WR_{n-1}) - (\Delta WR_n) \quad (5)$$

Then in step S15, the outpacing detection circuit 15 discriminates whether or not the evaluation value ΔV1 is higher than 0. If the outpacing detection circuit 15 discriminates that the evaluation value ΔV1 is higher than 0, then it advances the processing to step S16. On the contrary, if the outpacing detection circuit 15 discriminates that the evaluation value ΔV1 is not higher than 0, then it advances the processing to step S10.

In step S16, the outpacing detection circuit 15 discriminates whether or not the current finite difference time $\Delta WR_n$ is lower than the threshold value ThA. If it is discriminated that the current finite difference time $\Delta WR_n$ is lower than the threshold value ThA, then the processing advances to step S17. On the contrary if it is discriminated that the current finite difference time $\Delta WR_n$ is not lower than the threshold value ThA, then the processing advances to step S10.

In step S17, the outpacing detection circuit 15 outputs the outpacing flag C as its outpacing detection signal to the read control circuit 6-1. In step S18, the outpacing detection circuit 15 discriminates again whether or not the phases of the input synchronizing signal and the output synchronizing signal A are within an outpacing area. This is because it is necessary to vary the object of comparison for decision of a later operation depending upon whether or not the phases of the input synchronizing signal and the output synchronizing signal A are within an outpacing area after outpacing compensation is executed similarly as in the processing in step S7.

If it is discriminated in step S18 that the phases of the input synchronizing signal and the output synchronizing signal A are within an outpacing area, then the processing advances to step S19. In step S19, the outpacing detection circuit 15 discriminates whether or not the finite difference time $\Delta RW_{n+1}$ obtained using the output synchronizing signal A later by one cycle as a trigger is higher than the threshold value ThB. If it is discriminated that the finite difference time $\Delta RW_{n+1}$ is higher than the threshold value ThB, then the processing advances to step S21. In step S21, the outpacing detection circuit 15 outputs the outpacing flag D as an outpacing detection signal to the read control circuit 6-1.

On the other hand, if it is discriminated in step S18 that the phases of the input synchronizing signal and the output synchronizing signal A are not within an outpacing area, the processing advances to step S22. In step S22, the outpacing detection circuit 15 discriminates whether or not the finite difference time $\Delta WR_{n+1}$ obtained using the input synchronizing signal later by one cycle as a trigger is higher than the threshold value ThH. If it is discriminated in step S22 that the finite difference time $\Delta WR_{n+1}$ is higher than the threshold value ThH, then the processing advances to step S23. In step S23, the outpacing detection circuit 15 outputs the outpacing flag H2 as its outpacing detection signal to the read control circuit 6-1.

On the hand, if it is discriminated in step S19 that the finite difference time $\Delta RW_{n+1}$ is not higher than the threshold value ThB or if it is discriminated in step S22 that the finite difference time $\Delta WR_{n+1}$ is not higher than the threshold value ThH, then the processing advances to step S20. In step S20, the outpacing detection circuit 15 stands by until the input synchronizing signal for a next frame image and the output synchronizing signal A are inputted, and thereafter, the processing returns to step S18 so that similar processing to that described above is repeated.

As a result of the outpacing detection process described above, an outpacing detection signal is supplied to the read control circuit 6-1.

Referring back to FIG. 3, the scene change detection circuit 5 detects occurrence of a scene change of the image signal inputted thereto and outputs a scene change detection signal to the read control circuits 6-1 and 6-2.

Figure 6:
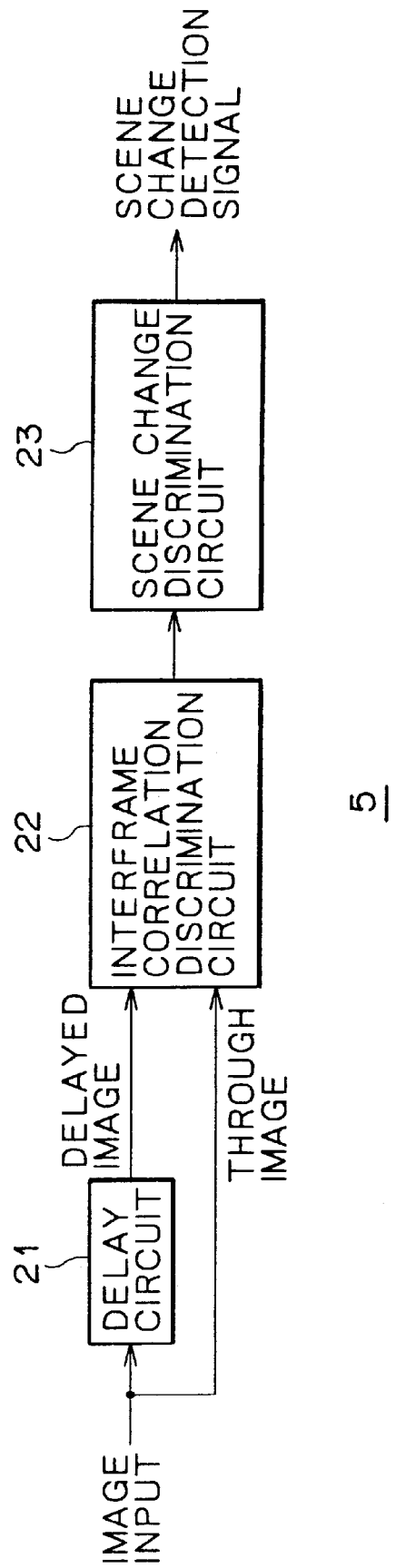
FIG. 6 is a block diagram showing an example of a construction of a scene change detection circuit of the frame synchronizer of FIG. 3.

FIG. 6 shows an example of a detailed construction of the scene change detection circuit 5. Referring to FIG. 6, the scene change detection circuit 5 includes a delay circuit 21 and an interframe correlation discrimination circuit 22 to both of which the image signal is inputted. The delay circuit 21 is formed from a frame memory for one frame, and delays a frame image inputted thereto from the preceding stage and outputs the delayed frame image to the interframe correlation discrimination circuit 22. The interframe correlation discrimination circuit 22 calculates a correlation value E between a through image not delayed and a delayed image delayed by a one-frame interval from the delay circuit 21 and outputs the correlation value E to a scene change discrimination circuit 23.

Figure 7:
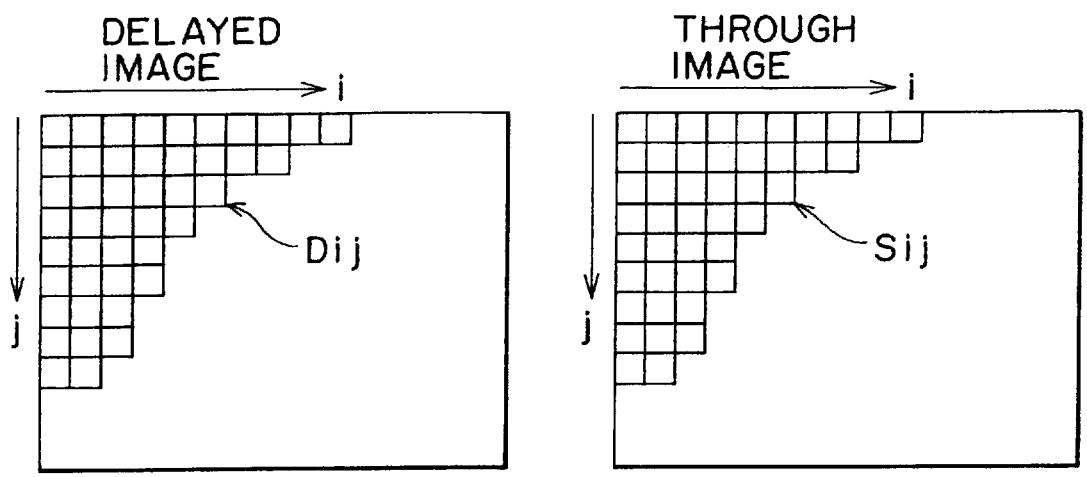
FIG. 7 is a diagrammatic view illustrating a correlation value calculation process of an interframe correlation discrimination circuit of the scene change detection circuit of FIG. 6.

The calculation of the correlation value E is described in more detail. Referring to FIG. 7, where the pixel value of a pixel of a through image positioned at a coordinate (i, j) is represented by $S_{ij}$ and the pixel value of a pixel of a delayed image positioned at the coordinate (i, j) is represented by $D_{ij}$, the sum total of absolute values of differences between the corresponding pixels of the through image and the delayed image is calculated as the correlation value E in accordance with the following expression (6):

Correlation value $E=\Sigma|D_{ij}-S_{ij}|$  (6)

The correlation value E indicates that, as the value thereof decreases, the correlation between the through image and the delayed image increases, that is, the similarity between the through image and the delayed image increases.

The scene change discrimination circuit 23 discriminates whether or not the correlation value E inputted from the interframe correlation discrimination circuit 22 is higher than a predetermined threshold value. If the scene change discrimination circuit 23 discriminates that the correlation value E is higher than the predetermined threshold value, then it determines that a scene change has been detected between the delayed image and the through image, and outputs a scene change detection signal to the read control circuits 6-1 and 6-2.

It is to be noted that, as the method of determining correlation between frames which makes a reference for detection of a scene change, various other methods than the method wherein the correlation value E is determined as described above may be selectively used including, for example, a method which uses correlation of histograms of signal levels of two successive frame images, another method wherein finite differences between corresponding pixels of two successive frame images are calculated and an integrated value of the finite differences is used as a correlation value, and a further method wherein two successive frame images are divided into blocks and correlation between each corresponding blocks is determined.

Referring back to FIG. 3, the read control circuit 6-1 decides a read address and a reading out timing based on the output synchronizing signal A, the outpacing detection signal inputted from the phase comparison circuit 4-1 and the scene change detection signal inputted form the scene change detection circuit 5 and controls an outpacing compensation process of a read circuit 7-1. The read control circuit 6-1 further controls a delay compensation process of the delay compensation circuit 8-1.

The outpacing compensation process is a process of reading out an image signal so that the read address may not precede the write address. Meanwhile, the delay compensation process is a process of correcting a displacement of an image caused in an image signal read out by the outpacing compensation process of the read circuit 7-1.

The outpacing compensation process is described in more detail with reference to FIGS. 8 and 9. The axis of abscissa of FIGS. 8 and 9 indicates the time base whose unit is a time of one horizontal scanning period, and represents a relative value with respect to 0 provided by a write timing Wa. The axis of ordinate indicates addresses of the frame memory 3 which correspond to line numbers of the image signal.

Figure 8:
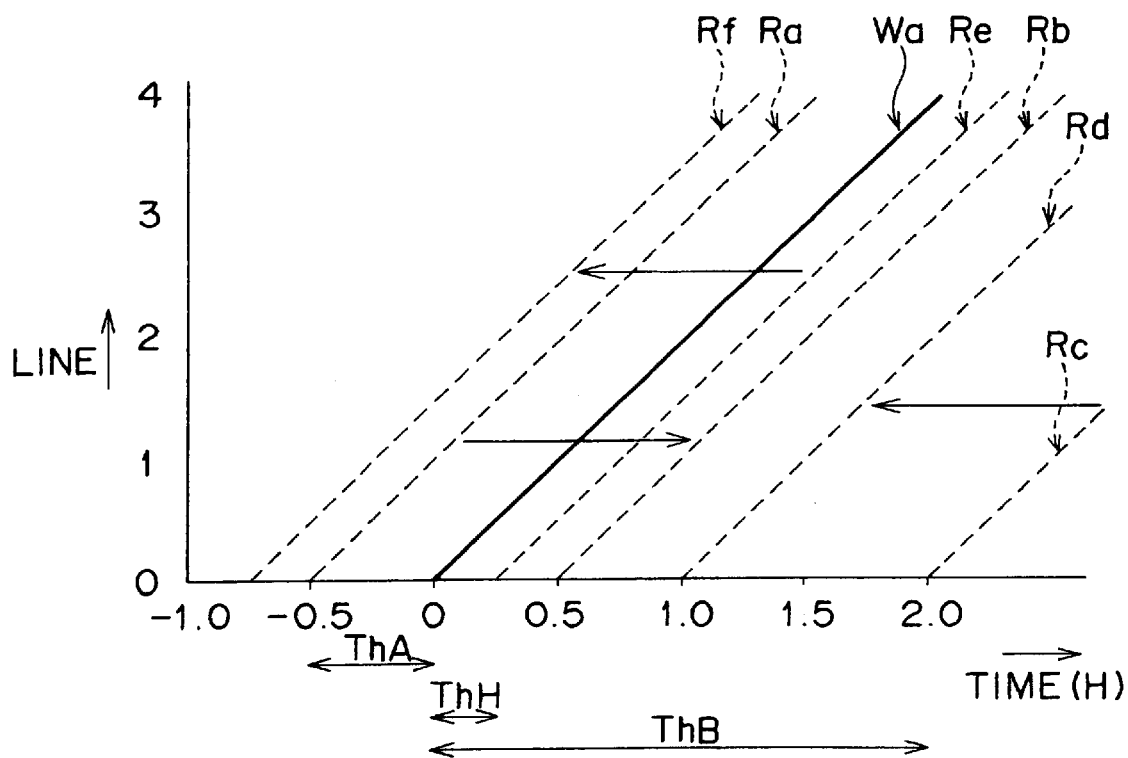
FIG. 8 is a diagrammatic views illustrating an outpacing compensation process for a read circuit of the frame synchronizer of FIG. 3.

FIG. 8 illustrates an example of read control where the cycle of the output synchronizing signal A is longer than the cycle of the input synchronizing signal. For example, where the finite difference time $\Delta RW$ (in the present case, 0.5 H) of the read timing Ra from the write timing Wa is smaller than the threshold value ThA, if this continues as it is, then outpacing will occur. Therefore, in order to prevent this, the read timing is controlled to be delayed by 1 H so that reading out may be performed at the timing Rb.

After the read timing Ra is delayed by 1 H to the timing Rb as described above, if the finite difference time $\Delta RW$ (in the present case, 2.0 H) of the read timing Rc with respect to the write timing Wa is higher than the threshold value ThB, in order to restore the read timing which has been delayed by 1 H precedently, the read timing is controlled so as to be advanced by 1 H so that reading out may be performed at the timing Rd.

Further, for example, if, after the read timing Ra is delayed by 1 H as described above, a fluctuation occurs with the frequency difference between the input synchronizing signal and the output synchronizing signal A and the movement of the read timing with respect to the write timing Wa is turned back so that the direction thereof changes from that till then (the direction in which the read timing is delayed with respect to the write timing, the rightward direction in FIG. 8) to the opposite direction (the direction in which the read timing precedes the write timing, the leftward direction in FIG. 8), then outpacing occurs again. Therefore, in order to prevent this, the read timing Re is controlled so as to be advanced by 1 H so that reading out is performed at the timing Rf.

Figure 9:
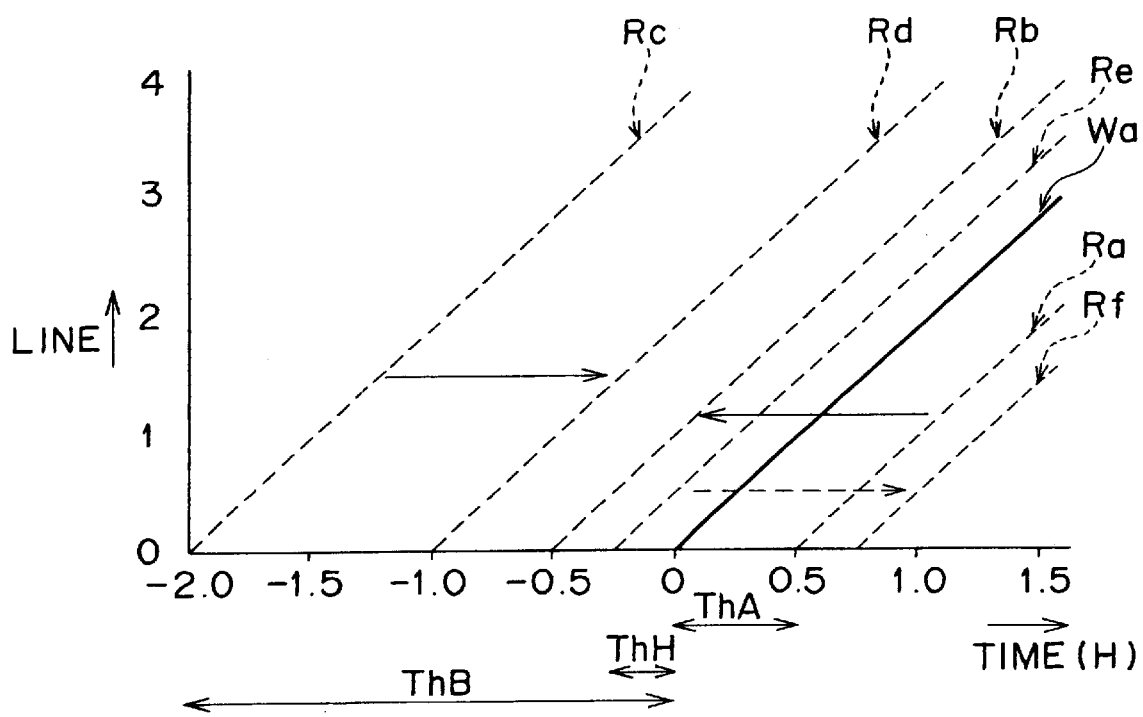
FIG. 9 is another diagrammatic views illustrating an outpacing compensation process for a read circuit of the frame synchronizer of FIG. 3.

FIG. 9 illustrates an example of read control where the cycle of the output synchronizing signal A is shorter than the cycle of the input synchronizing signal. For example, where the finite difference time ΔWR (in the present case, 0.5 H) of the read timing Ra from the write timing Wa is smaller than the threshold value ThA, if this continues as it is, then outpacing will occur. Therefore, in order to prevent this, the read timing is controlled so as to be delayed by 1 H so that reading out may be performed at the timing Rb.

After the read timing Ra is advanced by 1 H to the timing Rb as described above, if the finite difference time ΔRW (in the present case, 2.0 H) of the read timing Rc with respect to the write timing Wa is greater than the threshold value ThB, in order to restore the read timing which has been advanced by 1 H precedently, the read timing is controlled so as to be delayed by 1 H so that reading out may be performed at the timing Rd.

Further, for example, if, after the read timing Ra is advanced by 1 H to the timing Rb as described above, a fluctuation occurs with the frequency difference between the input synchronizing signal and the output synchronizing signal A and the movement of the read timing with respect to the write timing Wa is turned back so that the direction thereof changes from that till then (the direction in which the read timing precedes the write timing, the leftward direction in FIG. 9) to the opposite direction (the direction in which the read timing is delayed with respect to the write timing, the rightward direction in FIG. 9), then outpacing occurs again. Therefore, in order to prevent this, the read timing Re is controlled so as to be delayed by 1 H so that reading out is performed at the timing Rf.

Referring back to FIG. 3, the read circuit 7-1 reads out the image signal from the frame memory 3 by the outpacing compensation process under control of the read control circuit 6-1 and outputs the image signal to the delay compensation circuit 8-1. The delay compensation circuit 8-1 corrects the displacement of the image caused in the image signal inputted from the read circuit 7-1 by the delay compensation process under the control of the read control circuit 6-1 and outputs the corrected image signal to the next stage.

Figure 10:
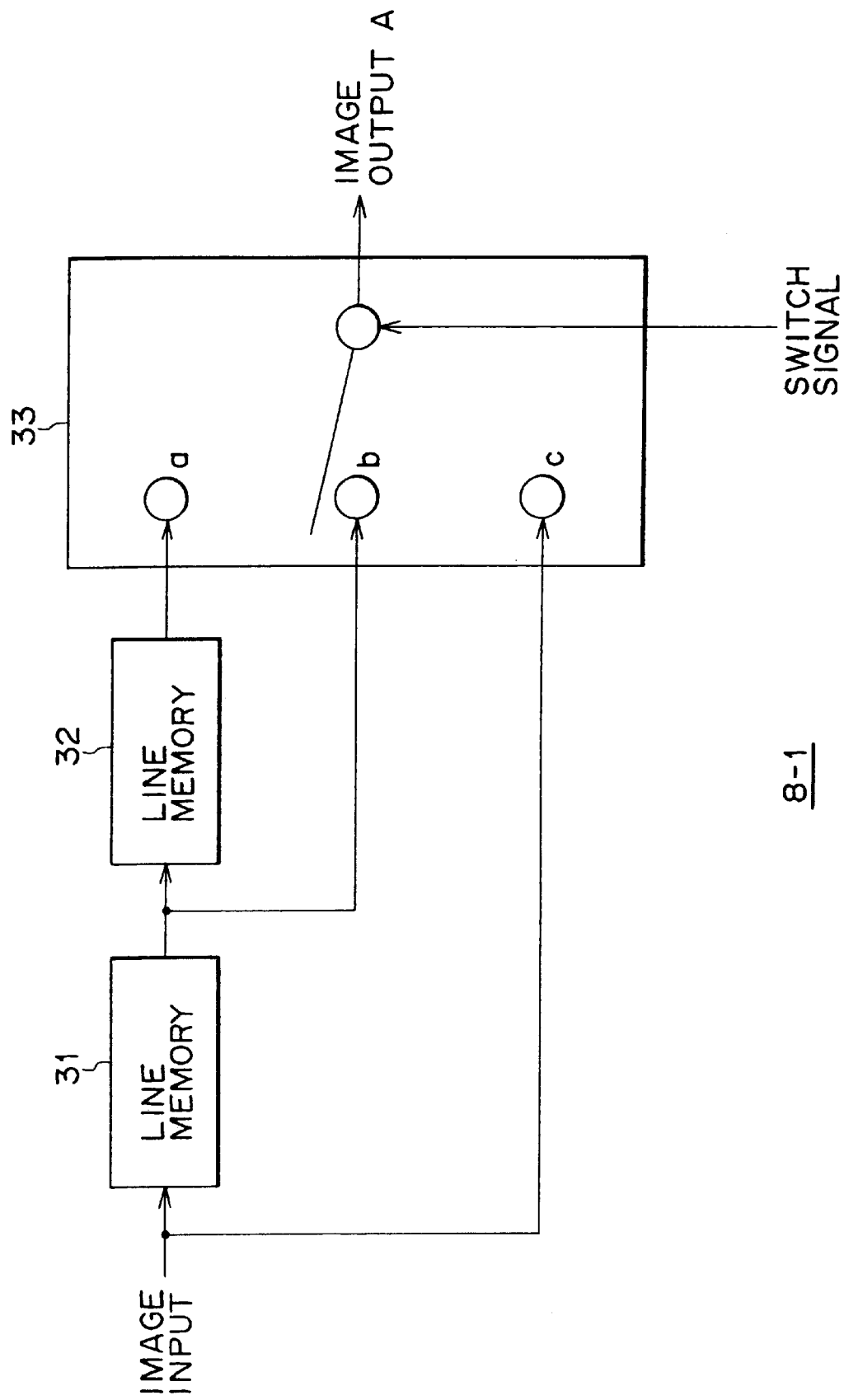
FIG. 10 is a block diagram showing an example of a construction of a delay compensation circuit of the frame synchronizer of FIG. 3.

FIG. 10 shows an example of a detailed construction of the delay compensation circuit 8-1. Referring to FIG. 10, in the delay compensation circuit 8-1, the image signal from the read circuit 7-1 is supplied to a line memory 31 and an input terminal c of a switch 33. The line memory 31 has a capacity for one horizontal scanning line, and delays the image signal inputted from the preceding stage by a time of one horizontal scanning period (1 L) and supplies the delayed image signal to the line memory 32 and another input terminal b of the switch 33. The line memory 32 has a capacity for one horizontal scanning line similarly to the line memory 31, and delays the image signal inputted from the line memory 31 by a time of one horizontal scanning period (1 L) and supplies the delayed image signal to a further input terminal a of the switch 33.

The switch 33 is normally held in a switched state to the input terminal b and performs switching in response to a switch signal inputted thereto from the read control circuit 6-1. The switch 33 thus outputs one of an image delayed by 1 L, another normal image and a further image advanced by 1 L inputted to the input terminals a, b and c, respectively.

Since the detailed construction and operation of the system shown in FIG. 3 and including the components beginning with the phase comparison circuit 4-2 to which the output synchronizing signal B is supplied, that is, the phase comparison circuit 4-2, read control circuit 6-2, read circuit 7-2 and delay compensation circuit 8-2, is similar to that of the system beginning with the phase comparison circuit 4-1 to which the output synchronizing signal A described above is supplied, that is, the phase comparison circuit 4-1, read control circuit 6-1, read circuit 7-1 and delay compensation circuit 8-1, description thereof is omitted herein.

If n systems similar to the system beginning with the phase comparison circuit 4-1 to which the output synchronizing signal A is supplied are additionally provided, then it is possible to output the image signal which is superposed further on n different additional output synchronizing signals.

Subsequently, the read control process of the first construction example (shown in FIG. 3) of the frame synchronizer is described with reference to a flowchart of FIG. 11 taking the system to which the output synchronizing signal A is supplied as an example.

The read control process is started when the read control circuit 6-1 begins to control the read circuit 7-1 in synchronism with the output synchronizing signal A after the image signal begins to be supplied to the write circuit 2 and the scene change detection circuit 5 and the input synchronizing signal begins to be supplied to the write control circuit 1 and the phase comparison circuit 4-1 and besides the output synchronizing signal A begins to be supplied to the phase comparison circuit 4-1 and the read control circuit 6-1. At this time, also the outpacing detection process of the phase comparison circuit 4-1 described above is executed parallelly. Furthermore, it is assumed that the write process of the image signal into the frame memory 3 is executed by the write circuit 2 under the control of the write control circuit 1 synchronized with the input synchronizing signal.

In step S31, the read control circuit 6-1 discriminates whether or not the outpacing flag A is detected as an outpacing detection signal from the phase comparison circuit 4-1. If it is discriminated that the outpacing flag A is detected, then the processing advances to step S32. In step S32, the read control circuit 6-1 executes a read control standby process.

Figure 12:
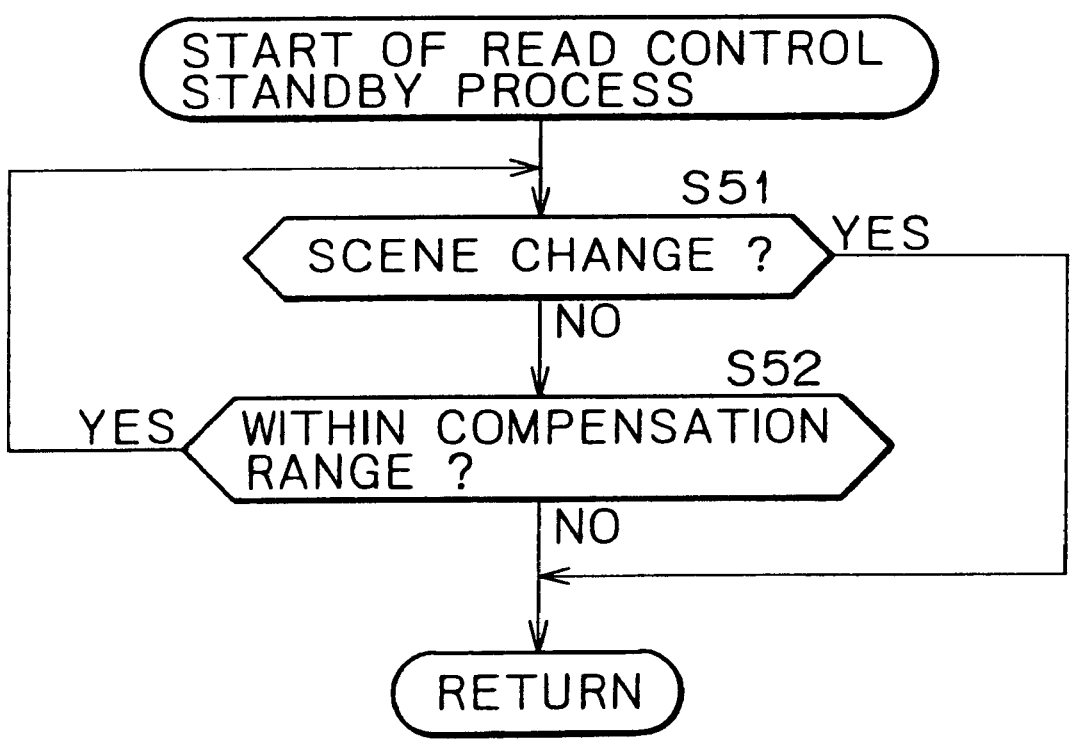
FIG. 12 is a flowchart illustrating a read control standby process in the read control process of FIG. 11.

Details of the read control standby process are described with reference to a flowchart of FIG. 12. In step S51, the read control circuit 6-1 discriminates whether or not a scene change signal is supplied thereto from the scene change detection circuit 5 to discriminate whether or not a scene change has occurred. If it is discriminated that no scene change signal is supplied and no scene change has occurred, then the processing advances to step S52.

In step S52, the read control circuit 6-1 discriminates whether or not the factor (outpacing whose occurrence has been predicted) with which the flag detected by the processing in the preceding step, in the present case, the flag A detected by the processing in step 31, is within a range of delay compensation of the delay compensation circuit 8-1, that is, a forward or backward displacement by one line. If it is discriminated that the factor is within the range of the compensation, then the processing returns to step S51. Conversely if it is discriminated that the factor is not within the range of the compensation, then the processing returns to the read control process of FIG. 11, in the present case, to step S33.

Figure 11:
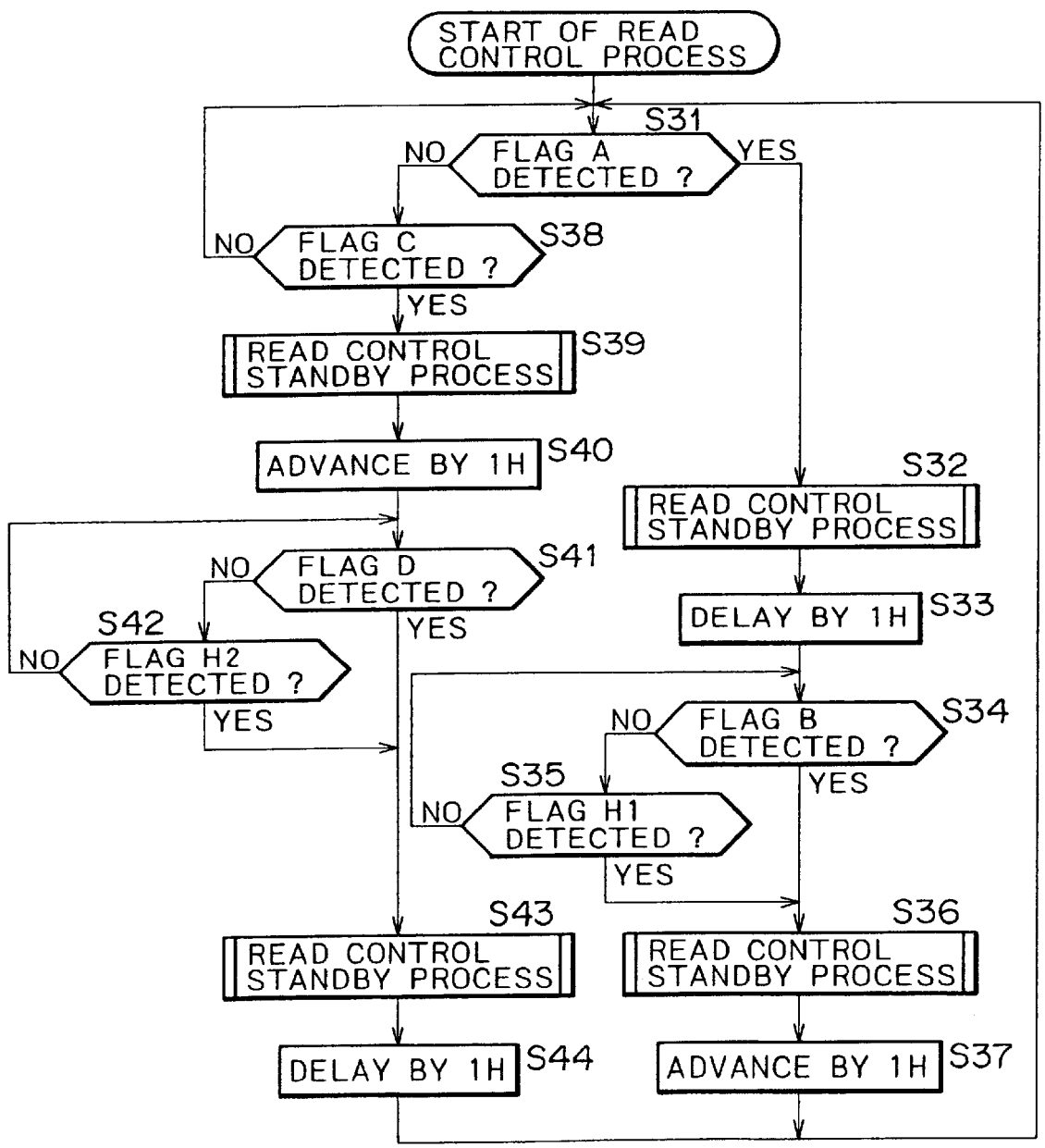
FIG. 11 is a flowchart illustrating a read control process of the frame synchronizer of FIG. 3.

On the other hand, also when it is discriminated in step S51 that a scene change signal is supplied and a scene change has occurred, the processing in step S52 is skipped, and the processing returns to the read control process of FIG. 11.

After such read control standby process as described above is executed, the processing returns to the process of FIG. 11. Referring back to FIG. 11, in step S33, the read circuit 7-1 delays the read timing by 1 H to read out the image signal under the control of the read control circuit 6-1 and outputs the image signal to the delay compensation circuit 8-1 (outpacing compensation process). The delay compensation circuit 8-1 switches the switch 33 built therein to the input terminal c in response to the switch signal from the read control circuit 6-1 so that an image signal advanced by 1 L is outputted to the next stage (delay compensation process).

In step S34, the read control circuit 6-1 discriminates whether or not the outpacing flag B is detected as an outpacing detection signal from the phase comparison circuit 4-1. If it is discriminated that the outpacing flag B is not detected, then the processing advances to step S35. In step S35, the read control circuit 6-1 discriminates whether or not the outpacing flag H1 is detected as an outpacing detection signal from the phase comparison circuit 4-1, and if it is discriminated that the outpacing flag H1 is not detected, then the processing returns to step S34.

Thereafter, the processing in steps S34 and S35 is repeated until either it is discriminated in step S34 that the outpacing flag B is detected or it is discriminated in step S35 that the outpacing flag H1 is detected. If it is discriminated in step S34 that the outpacing flag B is detected or if it is discriminated in step S35 that the outpacing flag H1 is detected, then the processing advances to step S36.

In step S36, the read control circuit 6-1 executes a read control standby process similarly as in the processing in step S32. In step S37, the read circuit 7-1 advances the read timing by 1 H to read out the image signal under the control of the read control circuit 6-1 and outputs the image signal to the delay compensation circuit 8-1 (restoration against the outpacing compensation process). The delay compensation circuit 8-1 switches the switch 33 built therein to the input terminal b in response to the switch signal from the read control circuit 6-1 so that a normal image signal is outputted to the next stage. Thereafter, the processing returns to step S31.

If it is discriminated in step S31 that the outpacing flag A is not detected as an outpacing detection signal from the phase comparison circuit 4-1, then the processing advances to step S38. In step S38, the read control circuit 6-1 discriminates whether or not the outpacing flag C is detected as an outpacing detection signal from the phase comparison circuit 4-1. If it is discriminated that the outpacing flag C is detected, then the processing advances to step S39. In step S39, the read control circuit 6-1 executes a read control standby process similarly as in the processing in step S32.

In step S40, the read circuit 7-1 advances the read timing by 1 H to read out the image signal under the control of the read control circuit 6-1 and outputs the image signal to the delay compensation circuit 8-1 (outpacing compensation process). The delay compensation circuit 8-1 switches the switch 33 built therein to the input terminal a in response to the switch signal from the read control circuit 6-1 so that an image signal delayed by 1 L is outputted to the next stage (delay compensation process).

In step S41, the read control circuit 6-1 discriminates whether or not the outpacing flag D is detected as an outpacing detection signal from the phase comparison circuit 4-1. If it is discriminated that the outpacing flag D is not detected, then the processing advances to step S42. In step S42, the read control circuit 6-1 discriminates whether or not the outpacing flag H2 is detected as an outpacing detection signal from the phase comparison circuit 4-1. If it is discriminated that the outpacing flag H2 is not detected, then the processing returns to step S41.

Thereafter, the processing in steps S41 and S42 is repeated until either it is discriminated in step S41 that the outpacing flag D is detected or it is discriminated in step S42 that the outpacing flag H2 is detected. If it is discriminated in step S41 that the outpacing flag D is detected or if it is discriminated in step S42 that the outpacing flag H2 is detected, then the processing advances to step S43.

In step S43, the read control circuit 6-1 executes a read control standby process similarly as in the processing in step S32. In step S44, the read circuit 7-1 delays the read timing by 1 H to read out the image signal under the control of the read control circuit 6-1 and outputs the image signal to the delay compensation circuit 8-1 (restoration against the outpacing compensation process). The delay compensation circuit 8-1 switches the switch 33 built therein to the input terminal b in response to the switch signal from the read control circuit 6-1 so that a normal image signal is outputted to the next stage. Thereafter, the processing advances to step S31 so that similar processing to that described above is repeated.

As described above, with the first construction example of the frame synchronizer, since outpacing compensation is executed at a timing at which a scene change occurs, a visually unnatural phenomenon such as skipping of an image or repetition of an image which is caused by execution of the outpacing compensation can be eliminated.

Further, since the direction of a variation of a read timing which arises from a fluctuation of a frequency difference between an input synchronizing signal and an output synchronizing signal is detected, outpacing compensation can be executed stably.

It is to be noted that, also in the system to which the output synchronizing signal B is supplied, since the read control standby process is executed similarly, it is theoretically possible to simultaneously output two image signals including an image signal synchronized with the output synchronizing signal A and another image signal synchronized with the output synchronizing signal B.

By the way, where an image signal is read out from the frame memory 3 simultaneously by two read systems as in the first construction example (shown in FIG. 3) of the frame synchronizer, actually an output port of the frame memory 3 must be used alternately by the two read systems. However, since the two read systems in the first construction example are fully independent of each other, a circuit for adjusting the read timings of the two read systems, that is, the timings at which the two read systems use the output port of the frame memory 3, is required. It is to be noted that a technique of using a limited port of a frame memory by a plurality of read systems has been proposed in Japanese Patent Application No. Hei 11-211866 by the assignee of the present application.

Figure 13:
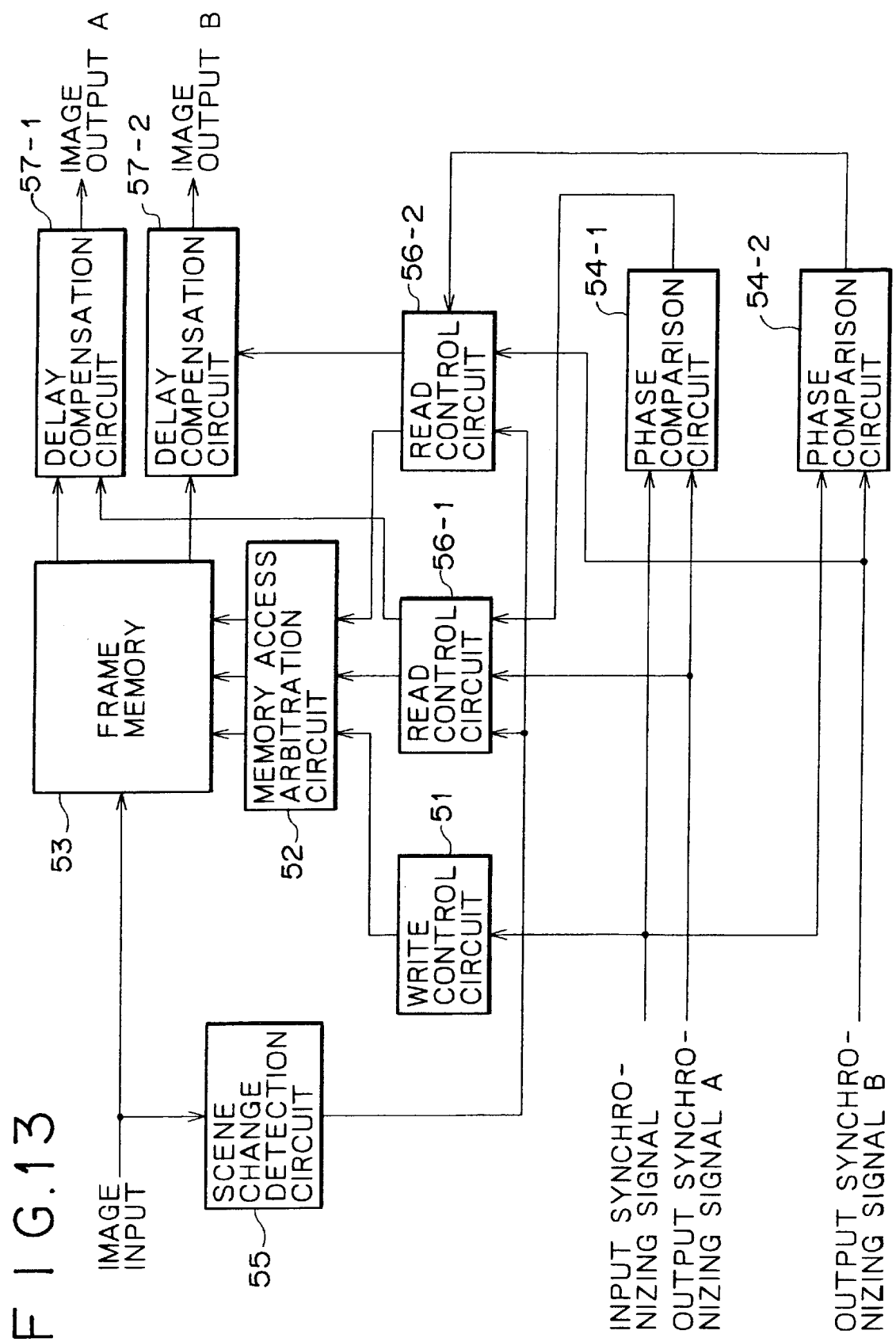
FIG. 13 is a block diagram showing a second example of a construction of the frame synchronizer to which the present invention is applied.

FIG. 13 shows an example of a construction (hereinafter referred to as a second construction example) of the frame synchronizer having such a circuit (memory access arbitration circuit 52) as just described. The second construction example of the frame synchronizer is described below with reference to FIG. 13.

In the frame synchronizer shown in FIG. 13, an image signal inputted is supplied to a frame memory 53 and a scene change detection circuit 55, and a corresponding input synchronizing signal is supplied to a write control circuit 51 and a pair of phase comparison circuits 54-1 and 54-2. An output synchronizing signal A is supplied to the phase comparison circuit 54-1 and a read control circuit 56-1, and another output synchronizing signal B is supplied to the phase comparison circuit 54-2 and another read control circuit 56-2.

The write control circuit 51 decides a write address and a write timing when the image signal is to be written into the frame memory 53 in response to the input synchronizing signal supplied thereto. The write control circuit 51 outputs the thus decided write control information to the memory access arbitration circuit 52.

The memory access arbitration circuit 52 controls a write operation of the image signal into the frame memory 53 based on the write control information from the write control circuit 51. The memory access arbitration circuit 52 further controls reading out of the image signal from the frame memory 53 and an outpacing compensation process based on read control information from the read control circuit 56-1. Furthermore, the memory access arbitration circuit 52 controls reading out of the image signal from the frame memory 53 and outpacing compensation processing based on read control information from the read control circuit 56-2.

The frame memory 53 has functions similar to those of the write circuit 2 and the read circuits 7-1 and 7-2 of FIG. 3, and writes the image signal inputted thereto into a storage area of itself and reads out the image data written in the storage area while executing an outpacing compensation process and then outputs the image data to a pair of delay compensation circuits 57-1 and 57-2 under the control of the memory access arbitration circuit 52.

The phase comparison circuit 54-1 continuously supervises the phase difference between the input synchronizing signal and the output synchronizing signal A to predict occurrence of outpacing and outputs the information as an outpacing detection signal to the read control circuit 56-1. It is to be noted that the phase comparison circuit 54-1 may have a similar detailed construction as that of the phase comparison circuit 4-1 described hereinabove with reference to FIG. 4, and therefore, detailed description of it is omitted here to avoid redundancy.

The scene change detection circuit 55 detects occurrence of a scene change of the image signal inputted thereto and outputs a scene change detection signal to the read control circuits 56-1 and 56-2. It is to be noted that the scene change detection circuit 55 may have a similar detailed construction as that of the scene change detection circuit 5 described hereinabove with reference to FIG. 6, and therefore, detailed description of it is omitted here to avoid redundancy.

The read control circuit 56-1 decides a read address and a read timing based on the output synchronizing signal A, the outpacing detection signal inputted from the phase comparison circuit 54-1 and the scene change detection signal inputted from the scene change detection circuit 55, and outputs the read control information thus decided to the memory access arbitration circuit 52. The read control circuit 56-1 further controls a delay compensation process of the delay compensation circuit 57-1.

The delay compensation circuit 57-1 corrects a displacement of an image caused in the image signal inputted from the frame memory 53 by a delay compensation process under the control of the read control circuit 56-1 and outputs the corrected image signal to the next stage. It is to be noted that the delay compensation circuit 57-1 may have a similar detailed construction as that of the delay compensation circuit 8-1 described hereinabove with reference to FIG. 10, and therefore, detailed description of it is omitted here to avoid redundancy.

It is to be noted that, since the detailed construction and operation of the system shown in FIG. 13 and including the components beginning with the phase comparison circuit 54-2 to which the output synchronizing signal B is supplied, that is, the phase comparison circuit 54-2, read control circuit 56-2 and delay compensation circuit 57-2, is similar to that of the system beginning with the phase comparison circuit 54-1 to which the output synchronizing signal A described above is supplied, that is, the phase comparison circuit 54-1, read control circuit 56-1 and delay compensation circuit 57-1, description thereof is omitted herein to avoid redundancy.

Further, if n systems similar to the system beginning with the phase comparison circuit 54-1 to which the output synchronizing signal A is supplied are additionally provided, then it is possible to output the image signal which is superposed further on n different additional output synchronizing signals.

The second construction example (shown in FIG. 13) of the frame synchronizer described above is characterized in that it additionally includes the memory access arbitration circuit 52 when compared with the first construction example (shown in FIG. 3). Due to the provision of the memory access arbitration circuit 52, a limited output port of the frame memory 53 can be used alternately by a plurality of read system.

However, the memory access arbitration circuit 52 requires some period of time for a process of arbitration for making it possible for the limited output port of the frame memory 53 to be used alternately by a plurality of read system. Therefore, some delay is provided until the frame memory 53 is controlled in response to the write control information from the write control circuit 51, the read control information from the read control circuit 56-1 and the read control information from the read control circuit 56-2. The delay may possibly give rise to a problem.

The problem just mentioned is described in detail with reference to FIGS. 14A to 14F. Where the input synchronizing signal has such timings as seen from FIG. 14C and the output synchronizing signal A has such timings as seen from FIG. 14D, if writing is executed in synchronism with the input synchronizing signal and reading out is executed in synchronism with the output synchronizing signal A, then outpacing of the read address with respect to the write address occurs within a period from the first frame to the third frame as seen from FIG. 14A.

Figure 14:
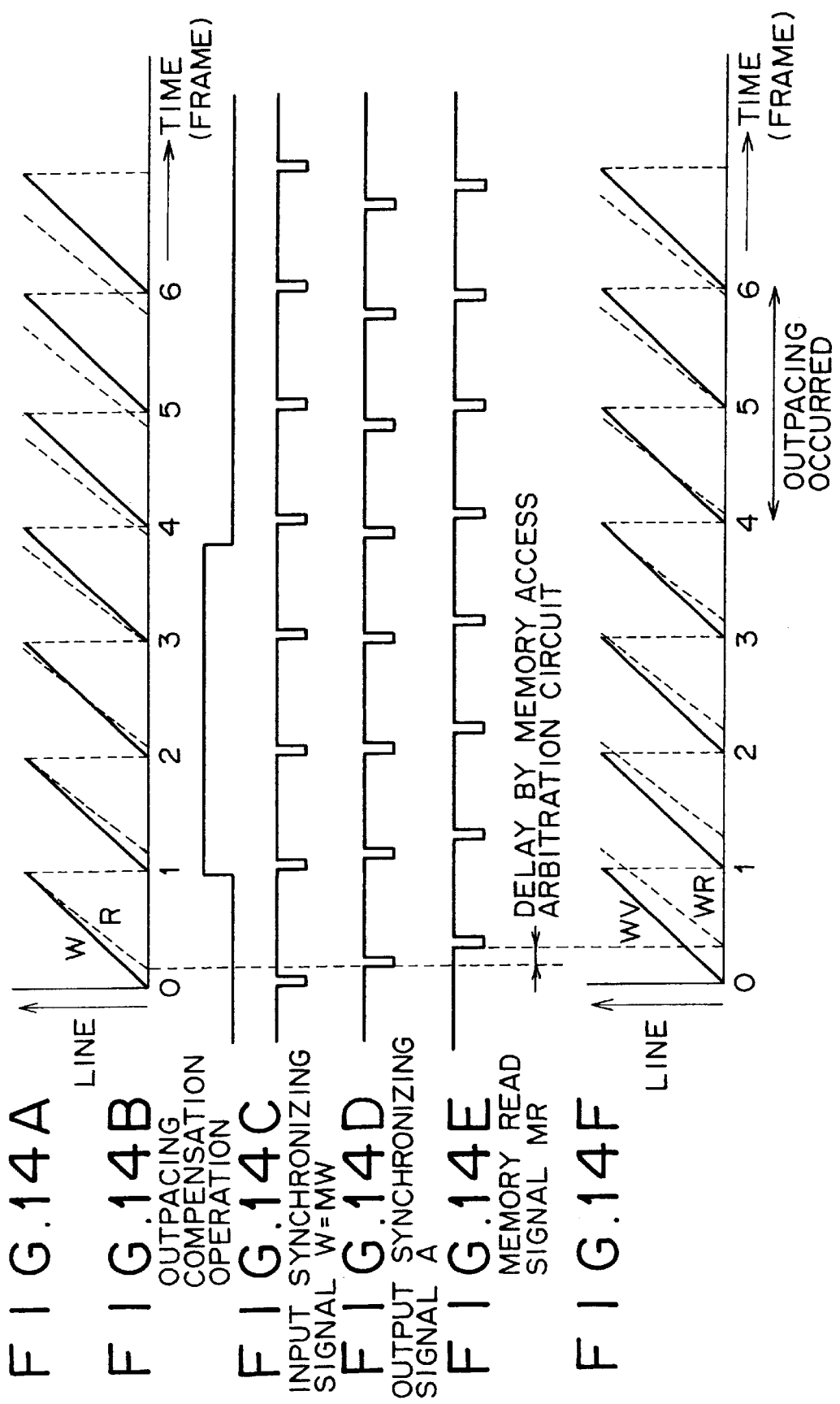
FIGS. 14A to 14F are waveform diagrams illustrating delay caused by an arbitration process of a memory access arbitration circuit of the frame synchronizer of FIG. 13.

Therefore, if the second construction example processes in a similar manner as with the first construction example, then such a period within which an outpacing compensation processing as seen from FIG. 14B is executed is decided based on the phase difference between the input synchronizing signal shown in FIG. 14C and the output synchronizing signal A shown in FIG. 14D.

Actually, however, reading out of the image signal from the frame memory 53 is performed at timings shown in FIG. 4E because of a delay caused by an arbitration process of the memory access arbitration circuit 52. Accordingly, even if an outpacing compensation process is executed within the period decided based on the phase difference between the input synchronizing signal shown in FIG. 4C and the output synchronizing signal A shown in FIG. 4D as described above, occurrence of outpacing within the period from the first frame to the third frame can be prevented. However, outpacing of the read address with respect to the write address occurs within another period from the fourth frame to the sixth frame as seen from FIG. 14F.

Therefore, in the second construction example of the frame synchronizer, a period within which an outpacing compensation process is to be performed is decided taking the delay amount which is fluctuated by the arbitration process of the memory access arbitration circuit 52 into consideration. The outpacing detection process of the phase comparison circuit 54-1 with the delay amount, which is fluctuated by the arbitration process of the memory access arbitration circuit 52, into consideration is described with reference to a flowchart of FIG. 15.

The outpacing detection process is started when the input synchronizing signal and the output synchronizing signal A are inputted to the phase comparison circuit 54-1.

In step S61, the phase comparison circuit 54-1 discriminates whether or not the phases of the input synchronizing signal and the output synchronizing signal A inputted thereto are within an outpacing area. If it is discriminated that the phases of the input synchronizing signal and the output synchronizing signal A are within an outpacing area, then the processing advances to step S62. In step S62, the phase comparison circuit 54-1 executes the outpacing detection process for the arbitration circuit.

The outpacing detection process for the arbitration circuit is described with reference to a flowchart of FIG. 16. In step S91, the phase comparison circuit 54-1 discriminates whether or not the finite difference time $\Delta RW_n$ between the current input synchronizing signal and the output synchronizing signal A is lower than a threshold value ThD1 and whether or not the finite difference time $\Delta WR_n$ between the output synchronizing signal A and the current input synchronizing signal is lower than another threshold value ThD2. The threshold value ThD1 is a maximum delay amount by which the output synchronizing signal A is delayed by the memory access arbitration circuit 52, and the threshold value ThD2 is a maximum delay amount by which the input synchronizing signal is delayed by the memory access arbitration circuit 52. The threshold values ThD1 and ThD2 are given to the outpacing detection circuit 15 in advance.

If it is discriminated in step S91 that the finite difference time $\Delta RW_n$ is lower than the threshold value ThD1 or the finite difference time $\Delta WR_n$ is lower than the threshold value ThD2, then since there is the possibility that outpacing may occur, the processing advances to step S92.

In step S92, the phase comparison circuit 54-1 calculates an evaluation value $\Delta V0=(\Delta RW_{n-1})-(\Delta RW_n)$ and another evaluation value $\Delta V1=(\Delta WR_{n-1})-(\Delta WR_n)$ to be used for prediction of occurrence of outpacing and discrimination of the directionality of the outpacing.

In step S93, the phase comparison circuit 54-1 discriminates whether or not the evaluation value $\Delta V0$ is higher than 0.

If it is discriminated in step S93 that the evaluation value $\Delta V0$ is higher than 0, then the processing advances to step S94. In step S94, the phase comparison circuit 54-1 outputs the outpacing flag A as an outpacing detection signal to the read control circuit 56-1.

On the contrary if it is discriminated in step S93 that the evaluation value $\Delta V0$ is not higher than 0, then the processing advances to step S95. In step S95, the phase comparison circuit 54-1 discriminates whether or not the evaluation value $\Delta V1$ is higher than 0.

If it is discriminated in step S95 that the evaluation value $\Delta V1$ is higher than 0, then the processing advances to step S96. In step S96, the phase comparison circuit 54-1 outputs the outpacing flag C as an outpacing detection signal to the read control circuit 56-1.

On the contrary if it is discriminated in step S95 that the evaluation value $\Delta V1$ is not larger than 0, then the processing advances to step S97. In step S97, the phase comparison circuit 54-1 outputs the outpacing flag A or B (either one is allowed) as an outpacing detection signal to the read control circuit 56-1.

It is to be noted that, if it is discriminated in step S91 that the finite difference time $\Delta RW_n$ is not smaller than the threshold value ThD1 and besides the finite difference time $\Delta WR_n$ is not smaller than the threshold value ThD2, then the processing in step S92 et seq. is skipped.

Figure 15:
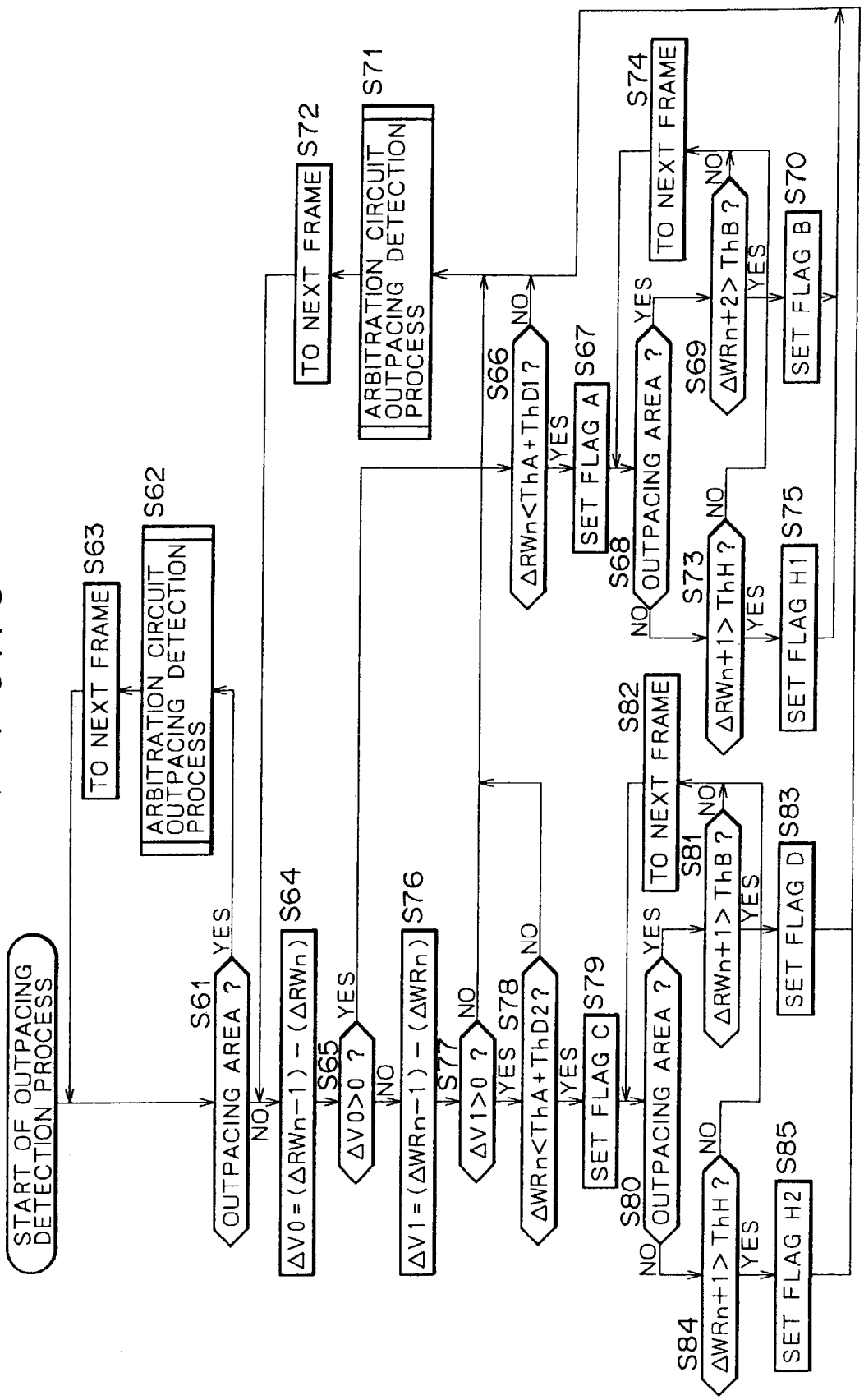
FIG. 15 is a flowchart illustrating an outpacing detection process of a phase comparison circuit of the frame synchronizer of FIG. 13.

Referring back to the outpacing detection process of FIG. 15, the phase comparison circuit 54-1 stands by in step S63 until the input synchronizing signal for a next frame image and the output synchronizing signal A are inputted, and thereafter, the processing returns to step S61. If it is discriminated in step S61 that the phases of the input synchronizing signal and the output synchronizing signal A are not within an outpacing area, then the processing advances to step S64. As a result of the processing in steps S61 to S63, the following processing beginning with step S64 is started in a state wherein the phases of the input synchronizing signal inputted currently and the output synchronizing signal A inputted are not within an outpacing area.

In step S64, the phase comparison circuit 54-1 calculates an evaluation value $\Delta V0=(\Delta WR_{n-1})-(\Delta WR_n)$ for prediction of occurrence of outpacing and discrimination of the directionality of the outpacing.

Then in step S65, the phase comparison circuit 54-1 discriminates whether or not the evaluation value $\Delta V0$ is larger than 0. If the phase comparison circuit 54-1 discriminates that the evaluation value $\Delta V0$ is larger than 0, then it advances the processing to step S66.

In step S66, the phase comparison circuit 54-1 discriminates whether or not the present finite difference time $\Delta RW$, is smaller than the threshold value ThA+threshold value ThD1. If it is discriminated that the present finite difference time $\Delta RW$, is smaller than the threshold value ThA+threshold value ThD1, then the processing advances to step S67, but on the contrary if it is discriminated that the present finite difference time $\Delta RW_n$ is not smaller than the threshold value ThA+threshold value ThD1, then the processing advances to step S71.

In step S67, the phase comparison circuit 54-1 outputs the outpacing flag A as its outpacing detection signal to the read control circuit 56-1. In step S68, the phase comparison circuit 54-1 discriminates again whether or not the phases of the input synchronizing signal and the output synchronizing signal A are within an outpacing area. This is because it is necessary to vary the object of comparison for decision of a later operation depending upon whether or not the phases of the input synchronizing signal and the output synchronizing signal A are within an outpacing area after outpacing compensation is executed.

If it is discriminated in step S68 that the phases of the input synchronizing signal and the output synchronizing signal A are within an outpacing area, then the processing advances to step S69. In step S69, the phase comparison circuit 54-1 discriminates whether or not the finite difference time $\Delta WR_{n+2}$ obtained using the input synchronizing signal later by two cycles as a trigger is larger than the threshold value ThB. If it is discriminated that the finite difference time $\Delta WR_{n+2}$ is larger than the threshold value ThB, then the processing advances to step S70. In step S70, the phase comparison circuit 54-1 outputs the outpacing flag B as an outpacing detection signal to the read control circuit 56-1.

In step S71, the phase comparison circuit 54-1 executes the outpacing detection process for the arbitration circuit similarly as in the processing in step S62. Then in step S72, the phase comparison circuit 54-1 stands by until the input synchronizing signal for a next frame image and the output synchronizing signal A are inputted. Thereafter, the processing returns to step S64 so that similar processing to that described above is repeated.

On the other hand, if it is discriminated in step S68 that the phases of the input synchronizing signal and the output synchronizing signal A are not within an outpacing area, then the processing advances to step S73. In step S73, the phase comparison circuit 54-1 discriminates whether or not the finite difference time $\Delta RW_{n+1}$ obtained using the output synchronizing signal A later by one cycle as a trigger is larger than the threshold value ThH. If it is discriminated that the finite difference time $\Delta RW_{n+1}$ is larger than the threshold value ThH, then the processing advances to step S75. In step S75, the phase comparison circuit 54-1 outputs the outpacing flag H1 as its outpacing detection signal to the read control circuit 56-1.

On the hand, if it is discriminated in step S69 that the finite difference time $\Delta WR_{n+2}$ is not larger than the threshold value ThB or if it is discriminated in step S73 that the finite difference time $\Delta RW_{n+1}$ is not larger than the threshold value ThH, then the processing advances to step S74. In step S74, the phase comparison circuit 54-1 stands by until the input synchronizing signal corresponding to a next frame image and the output synchronizing signal A are inputted, and thereafter, the processing returns to step S68 so that similar processing to that described above is repeated.

If it is discriminated in step S65 that the evaluation value $\Delta V0$ is not larger than 0, then the processing advances to step S76.

In step S76, the phase comparison circuit 54-1 calculates an evaluation value $\Delta V1=(\Delta WR_{n-1})-\Delta WR_n$ for prediction of occurrence of outpacing and discrimination of the directionality of the outpacing.

Then in step S77, the phase comparison circuit 54-1 discriminates whether or not the evaluation value $\Delta V1$ is larger than 0. If the phase comparison circuit 54-1 discriminates that the evaluation value $\Delta V1$ is larger than 0, then it advances the processing to step S78. On the contrary, if the phase comparison circuit 54-1 discriminates that the evaluation value $\Delta V1$ is not larger than 0, then it advances the processing to step S71.

In step S78, the phase comparison circuit 54-1 discriminates whether or not the present finite difference time $\Delta WR_n$ is smaller than the threshold value ThA+threshold value ThD2. If it is discriminated that the current finite difference time $\Delta WR_n$ is lower than the threshold value ThA+threshold value ThD2, then the processing advances to step S79, but on the contrary if it is discriminated that the present finite difference time $\Delta WR_n$ is not smaller than the threshold value ThA+threshold value ThD2, then the processing advances to step S71.

In step S79, the phase comparison circuit 54-1 outputs the outpacing flag C as its outpacing detection signal to the read control circuit 56-1. In step S80, the phase comparison circuit 54-1 discriminates again whether or not the phases of the input synchronizing signal and the output synchronizing signal A are within an outpacing area. This is because it is necessary to vary the object of comparison for decision of a later operation depending upon whether or not the phases of the input synchronizing signal and the output synchronizing signal A are within an outpacing area after outpacing compensation is executed similarly as in the processing in step S68.

If it is discriminated in step S80 that the phases of the input synchronizing signal and the output synchronizing signal A are within an outpacing area, then the processing advances to step S81. In step S81, the phase comparison circuit 54-1 discriminates whether or not the finite difference time $\Delta RW_{n+1}$ obtained using the output synchronizing signal A later by one cycle as a trigger is larger than the threshold value ThB. If it is discriminated that the finite difference time $\Delta RW_{n+1}$ is larger than the threshold value ThB, then the processing advances to step S83. In step S83, the phase comparison circuit 54-1 outputs the outpacing flag D as an outpacing detection signal to the read control circuit 56-1.

On the other hand, if it is discriminated in step S80 that the phases of the input synchronizing signal and the output synchronizing signal A are not within an outpacing area, then the processing advances to step S84. In step S84, the phase comparison circuit 54-1 discriminates whether or not the finite difference time $\Delta WR_{n+1}$ obtained using the input synchronizing signal later by one cycle as a trigger is larger than the threshold value ThH. If it is discriminated that the finite difference time $\Delta WR_{n+1}$ is higher than the threshold value ThH, then the processing advances to step S85. In step S85, the phase comparison circuit 54-1 outputs the outpacing flag H2 as its outpacing detection signal to the read control circuit 56-1.

On the other hand, if it is discriminated in step S81 that the finite difference time $\Delta RW_{n+1}$ is not larger than the threshold value ThB or if it is discriminated in step S84 that the finite difference time $\Delta WR_{n+1}$ is not larger than the threshold value ThH, then the processing advances to step S82. In step S82, the phase comparison circuit 54-1 stands by until the input synchronizing signal for a next frame image and the output synchronizing signal A are inputted, and thereafter, the processing returns to step S80 so that similar processing to that described above is repeated.

As a result of the outpacing detection process described above, an outpacing detection signal is supplied from the phase comparison circuit 54-1 to the read control circuit 56-1. Also in the system to which the output synchronizing signal B is supplied, a similar outpacing detection process is executed, and an outpacing detection signal is supplied from the phase comparison circuit 54-2 to the read control circuit 56-2.

It is to be noted that, since the outpacing detection signals supplied to the read control circuits 56-1 and 56-2 correspond to the fluctuating delay amount of the memory access arbitration circuit 52, if the read control circuits 56-1 and 56-2 executes, similarly to the read control circuit 6-1 of the first construction example (shown in FIG. 3), the read control process in accordance with the flowchart shown in FIG. 11 based on the output synchronizing signal A, the outpacing detection signal supplied from the phase comparison circuit 54-1 and the scene change detection signal from the scene change detection circuit 55, then two image signals including an image signal synchronized with the output synchronizing signal A and another image signal synchronized with the output synchronizing signal B are outputted simultaneously.

Figure 17:
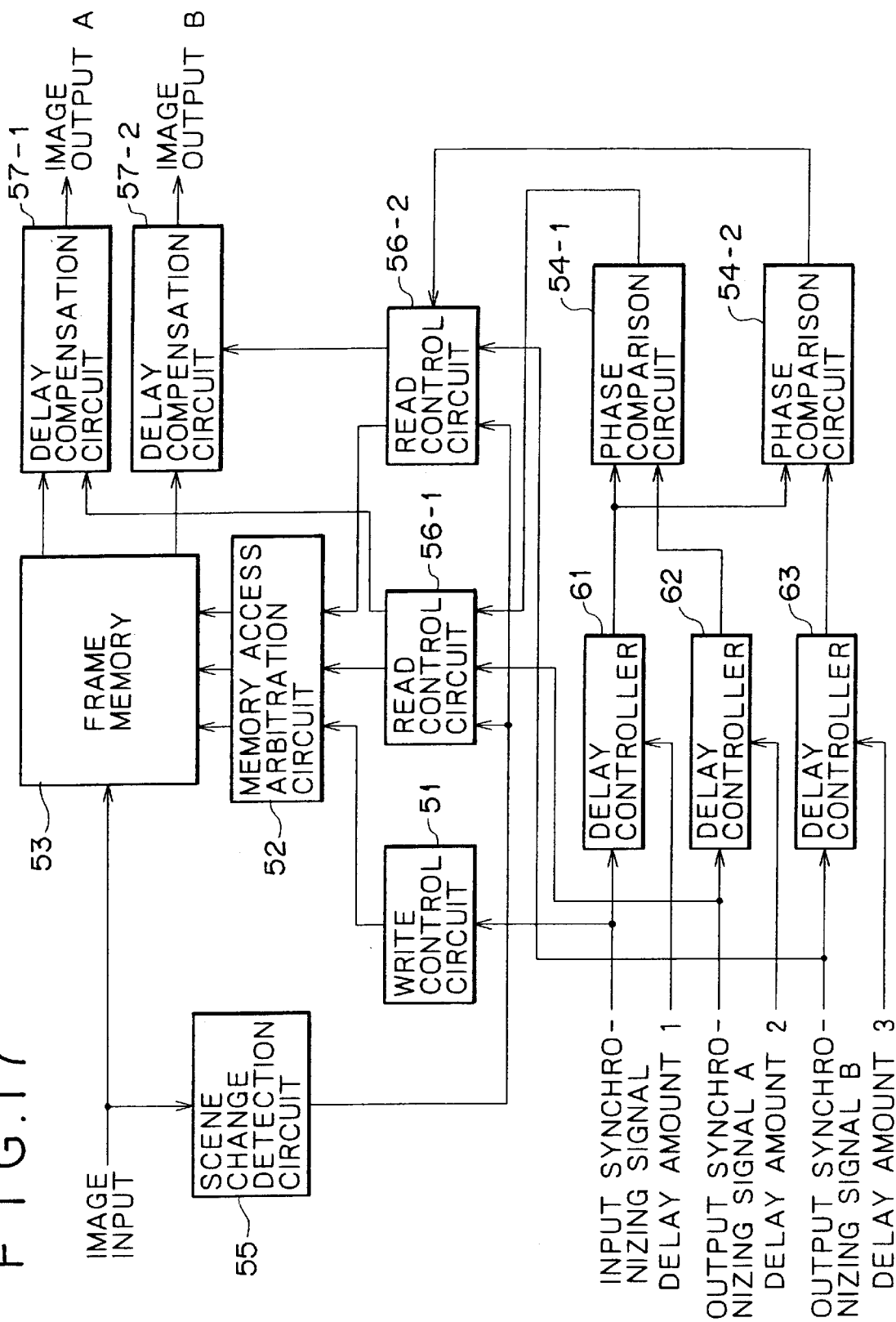
FIG. 17 is a block diagram showing a third example of a construction of the frame synchronizer to which the present invention is applied.

Referring now to FIG. 17, there is shown a third construction example of the frame synchronizer. The third construction example shown in FIG. 17 is similar to but different from the second construction example described hereinabove with reference to FIG. 13 in that it additionally includes delay controllers 61 to 63. The third construction example is applied where the delay amounts in write control and read control by the arbitration process of the memory access arbitration circuit 52 are known fixed amounts.

In the third construction example, a delay amount 1 and an input synchronizing signal are inputted to the delay controller 61. The delay amount is a known fixed amount by which write control information from the write control circuit 51 is delayed by the memory access arbitration circuit 52. The delay controller 61 delays the input synchronizing signal by the delay amount 1 and outputs the delayed input synchronizing signal to the phase comparison circuits 54-1 and 54-2.

To the delay controller 62, another delay amount 2 and an output synchronizing signal A are inputted. The delay amount 2 is a known fixed amount by which read control information from the read control circuit 56-1 is delayed by the memory access arbitration circuit 52. The delay controller 62 delays the output synchronizing signal A by the delay amount 2 and outputs the delayed output synchronizing signal A to the phase comparison circuit 54-1.

To the delay controller 63, a further delay amount 3 and another output synchronizing signal B are inputted. The delay mount 3 is a known fixed amount by which read control information from the read control circuit 56-2 is delayed by the memory access arbitration circuit 52. The delay controller 63 delays the output synchronizing signal B by the delay mount 3 and outputs the delayed output synchronizing signal B to the phase comparison circuit 54-2.

It is to be noted that, to the delay controllers 61 to 63, the delay amounts 1 to 3 may be inputted directly from the memory access arbitration circuit 52 or may be inputted from a microcomputer or the like which controls the entire frame synchronizer.

The components of the third construction example other than the delay controllers 61 to 63 are similar to those of the second construction example described hereinabove, and overlapping description of them is omitted herein to avoid redundancy.

Subsequently, operation of the system of the third construction example to which the output synchronizing signal A is supplied is described with reference to FIGS. 18A to 18G. To the write control circuit 51, an input synchronizing signal illustrated in FIG. 18B is inputted. To the read control circuit 56-1, an output synchronizing signal A illustrated in FIG. 18C is inputted.

For example, if an image signal is written into the frame memory 53 in synchronism with the input synchronizing signal illustrated in FIG. 18B and then read out from the frame memory 53 in synchronism with the output synchronizing signal A illustrated in FIG. 18C, then the read address outpaces the write address within a period from the first frame to the third frame as seen from FIG. 18A. However, the actual write timing and read timing are delayed by the delay amount 1 or delay mount 2 by the arbitration process of the memory access arbitration circuit 52. In particular, writing and reading out are performed at such timings at which the read address precedes the write address within the period from the third frame to the sixth frame as seen from FIG. 18F.

Figure 5:
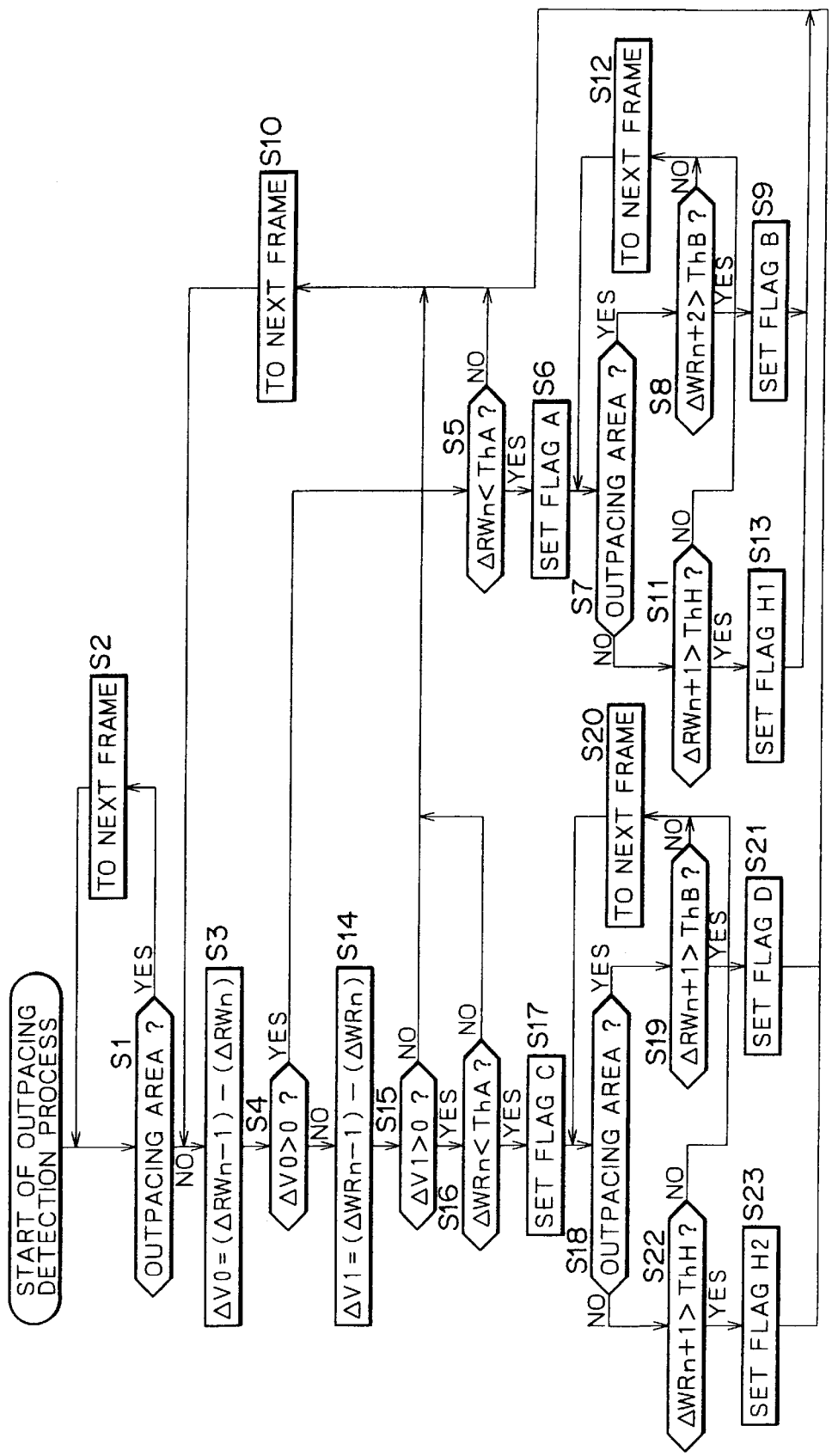
FIG. 5 is a flowchart illustrating an outpacing detection process of an outpacing detection circuit of the phase comparison circuit of FIG. 4.

By the way, since the input synchronizing signal (shown in FIG. 18D) delayed by the delay amount 1 by the delay controller 61 and the output synchronizing signal A (shown in FIG. 18E) delayed by the delay amount 2 by the delay controller 62 are supplied to the phase comparison circuit 54-1, if the phase comparison circuit 54-1 executes the outpacing detection processing illustrated in FIG. 5 similarly to the phase comparison circuit 4-1 of the first construction example, then the resulting outpacing detection signal to be outputted is formed taking the delay amount by the memory access arbitration circuit 52 into consideration. Accordingly, the read control circuit 56-1 outputs a read control signal so that the outpacing compensation process may be executed at such a timing as shown in FIG. 18G.

In the next stage to the memory access arbitration circuit 52, similar processing to the processing of the second construction example described hereinabove is executed. Also in the system to which the output synchronizing signal B is supplied, similar operation is executed.

As a result of such operation as described above, two image signals including an image signal synchronized with the output synchronizing signal A and another image signal synchronized with the output synchronizing signal B are outputted simultaneously from the third construction example of the frame synchronizer similarly to the second construction example (shown in FIG. 13).

The series of processes described hereinabove can be executed by hardware or by software. In order for the series of processes to be executed by software, a program for implementing the software is installed into a computer incorporated in the frame synchronizer as hardware for exclusive use or a personal computer, for example, for universal use which can execute various functions by installing various programs.

FIG. 19 shows an example of a construction of a personal computer which implements the frame synchronizer of the present embodiment. Referring to FIG. 19, the personal computer shown includes a central processing unit (CPU) 101 built therein. An input/output interface 105 is connected to the CPU 101 over a bus 104. Connected to the CPU 101 over the bus 104 are an inputting section 106 formed from an inputting device such as a keyboard or a mouse, a display unit 107 for displaying an image as a result of processing, a storage section 108 formed from a hard disk drive for storing programs and various data, a communication section 109 for communicating data through the Internet or the like, and a drive 110 for writing and reading out data onto and from a recording medium such as a magnetic disk 111, a optical disk 112, a magneto-optical disk 113 or a semiconductor memory 114. Also a ROM (Read Only Memory) 102 and a RAM (Random Access Memory) 103 are connected to the bus 104.

A controlling program for causing the personal computer to control the frame synchronizer is stored on any of the magnetic disk 111, optical disk 112, magneto-optical disk 113 and semiconductor memory 114 and supplied to the personal computer. Then, the controlling program is read out by the drive 110 and installed into the hard disk drive built in the storage section 108. The controlling program installed in the storage section 108 is loaded from the storage section 108 into the RAM 103 in accordance with an instruction of the CPU 101 corresponding to a command from a user inputted to the inputting section 106, and is executed by the personal computer.

It is to be noted that, in the present specification, the steps which describe any program provided by a recording medium include not only those processes which are executed in a time series in accordance with the order in which they are described but also those processes which may not necessarily be executed in time series but be executed parallelly or individually.

Further, in the present specification, the term "system" signifies an entire apparatus or section which is composed of a plurality of apparatus or components.

While preferred embodiments of the present invention have been described using specific terms, such description is for illustrative purposes only, and it is to be understood that changes and variations may be made without departing from the spirit or scope of the following claims.

What is claimed is:

1. A synchronizing conversion apparatus for converting a synchronizing frequency of an image signal, comprising:

an image memory;

write means for writing the image signal into said image memory in synchronism with a first synchronizing frequency signal inputted thereto;

read means for reading out the image signal from said image memory in synchronism with a second synchronizing frequency signal inputted to said read means and having a frequency different from that of the first synchronizing frequency signal;

detection means for detecting a phase difference between the first and second synchronizing frequency signals;

prediction means for predicting occurrence of outpacing between a read address and a write address for said image memory based on the phase difference detected by said detection means;

modification means for modifying a reading out timing of said read means in response to a result of the prediction of said prediction means; and delay compensation means for executing delay compensation for the image signal read out by said read means in response to the result of the prediction of said prediction means.

2. A synchronizing conversion apparatus according to claim 1, wherein said detection means additionally detects a variation of the phase difference which arises from a fluctuation of the frequency of the first or second synchronizing frequency signal.

3. A synchronizing conversion apparatus according to claim 1, further comprising scene change detection means for detecting a scene change of the image signal, and wherein said modification means modifies the reading out timing of said read means in response to a timing at which a scene change of the image signal is detected by said scene change detection means.

4. A synchronizing conversion apparatus according to claim 1, which comprises two or more read systems each of which includes said read means, detection means, prediction means, modification means and delay compensation means.

5. A synchronizing conversion apparatus according to claim 4, further comprising arbitration means for arbitrating the writing process of said write means into said image memory and reading out processes of said read means of said read systems from said image memory.

6. A synchronizing conversion apparatus according to claim 5, wherein said prediction means predicts occurrence of outpacing between the read address and the write address for said image memory based on the phase difference detected by said detection means and a time required for the arbitration process of said arbitration means.

7. A synchronizing conversion apparatus according to claim 5, further comprising delay means for delaying the first and second synchronizing frequency signals by a time required for the arbitration process of said arbitration means and supplying the delayed first and second synchronizing frequency signals to said detection means.

8. A synchronizing conversion method for a synchronizing conversion apparatus for converting a synchronizing frequency of an image signal, comprising:

a write step of writing the image signal into an image memory in synchronism with a first synchronizing frequency signal inputted to said synchronizing conversion apparatus;

a read step of reading out the image signal from said image memory in synchronism with a second synchronizing frequency signal inputted to said synchronizing conversion apparatus and having a frequency different from that of the first synchronizing frequency signal;

a detection step of detecting a phase difference between the first and second synchronizing frequency signals;

a prediction step of predicting occurrence of outpacing between a read address and a write address for said image memory based on the phase difference detected by the detection step;

a modification step of modifying a reading out timing of the read step in response to a result of the prediction of the prediction step; and a delay compensation step of executing delay compensation for the image signal read out by the read step in response to the result of the prediction of the prediction step.

9. A recording medium on which a computer-readable program for synchronizing conversion for converting a synchronizing frequency of an image signal is recorded, the program comprising:

a write step of writing the image signal into an image memory in synchronism with a first synchronizing frequency signal inputted to said synchronizing conversion apparatus;

a read step of reading out the image signal from said image memory in synchronism with a second synchronizing frequency signal inputted to said synchronizing conversion apparatus and having a frequency different from that of the first synchronizing frequency signal;

a detection step of detecting a phase difference between the first and second synchronizing frequency signals;

a prediction step of predicting occurrence of outpacing between a read address and a write address for said image memory based on the phase difference detected by the detection step;

a modification step of modifying a reading out timing of the read step in response to a result of the prediction of the prediction step; and a delay compensation step of executing delay compensation for the image signal read out by the read step in response to the result of the prediction of the prediction step.

* * * * *